(12) United States Patent
McGregor et al.

(10) Patent No.: US 7,904,336 B2
(45) Date of Patent: Mar. 8, 2011

(54) SYSTEM FOR GENERATING REVENUE USING ELECTRONIC MAIL AND METHOD FOR ITS USE

(75) Inventors: G. Mark McGregor, Otterbein, IN (US); Bret J. Besecker, Lafayette, IN (US)

(73) Assignee: NCR Corporation, Duluth, GA (US)

( * ) Notice: Subject to any disclaimer, the term of this patent is extended or adjusted under 35 U.S.C. 154(b) by 2886 days.

(21) Appl. No.: 09/832,767

(22) Filed: Apr. 11, 2001

(65) Prior Publication Data

US 2002/0026360 A1    Feb. 28, 2002

Related U.S. Application Data

(60) Provisional application No. 60/196,191, filed on Apr. 11, 2000.

(51) Int. Cl.
*G06Q 30/00* (2006.01)
*G06F 15/16* (2006.01)

(52) U.S. Cl. ............ 705/14.66; 705/14.69; 709/246

(58) Field of Classification Search .......... 705/14, 705/14.66, 14.69; 709/246
See application file for complete search history.

(56) References Cited

U.S. PATENT DOCUMENTS

| | | | |
|---|---|---|---|
| 5,339,239 A | 8/1994 | Manabe et al. | 364/401 |
| 5,466,919 A | 11/1995 | Hovakimian | 235/380 |
| 5,475,585 A | 12/1995 | Bush | 364/401 |
| 5,506,393 A | 4/1996 | Ziarno | 235/380 |
| 5,555,497 A | 9/1996 | Helbling | 364/401 |
| 5,564,546 A | 10/1996 | Molbak et al. | 194/216 |
| 5,621,640 A | 4/1997 | Burke | 395/214 |
| 5,663,547 A | 9/1997 | Ziarno | 235/380 |
| 5,665,952 A | 9/1997 | Ziarno | 235/380 |
| 5,696,366 A | 12/1997 | Ziarno | 235/380 |
| 5,724,518 A | 3/1998 | Helbling | 395/201 |
| 5,734,838 A | 3/1998 | Robinson et al. | 395/214 |
| 5,801,365 A | 9/1998 | Katz | 235/359 |
| 5,806,045 A | 9/1998 | Biorge et al. | 705/14 |
| 5,826,241 A | 10/1998 | Stein et al. | 705/26 |
| 5,895,454 A | 4/1999 | Harrington | 705/26 |
| 5,909,794 A | 6/1999 | Molbak et al. | 194/216 |

(Continued)

FOREIGN PATENT DOCUMENTS

WO    WO0079436    * 12/2000

OTHER PUBLICATIONS

Tweney, Dylan, "Setting in stone the 10 commandments of I-commerce", InfoWorld, v. 20 n. 5 (Feb. 2, 1998): 50.*
Definition of "email", Microsoft Press Computer Dictionary, Third Ed. (Redmond, WA: Microsoft Corp., 1997).*
Definition of "POP3", Microsoft Press Computer Dictionary, 3$^{rd}$ ed. (Redmond WA: Microsoft Press, 1997).*
"E-mail Attachments", downloaded Dec. 18, 2010 from http://macefficiency.com/me101/1999/49_E-mailAttachments.html.*

(Continued)

*Primary Examiner* — Donald L Champagne
(74) *Attorney, Agent, or Firm* — Paul Martin; Peter Priest

(57) ABSTRACT

A system and a method whereby e-mail users may send e-mail messages appended with advertising. E-mail sent from the e-mail user's e-mail account is routed through a standard email delivery system. The e-mail message is further processed by a software means which appends thereto another software means operable to cause an advertisement to appear when the e-mail message is opened by the e-mail recipient. In one embodiment, a portion of the revenue generated by the advertising may be distributed to a charitable organization. The e-mail user sending the e-mail message may designate a charitable organization to receive such contributions. The present invention may be used with any e-mail technology.

12 Claims, 12 Drawing Sheets

U.S. PATENT DOCUMENTS

| | | | | |
|---|---|---|---|---|
| 5,937,391 | A | 8/1999 | Ikeda et al. | 705/14 |
| 5,956,700 | A | 9/1999 | Landry | 705/40 |
| 5,960,412 | A | 9/1999 | Tackbary et al. | 705/27 |
| 6,029,141 | A | 2/2000 | Bezos et al. | 705/27 |
| 6,032,133 | A | 2/2000 | Hilt et al. | 705/40 |
| 6,434,745 | B1 * | 8/2002 | Conley, Jr. et al. | 717/177 |
| 6,449,634 | B1 * | 9/2002 | Capiel | 709/206 |
| 6,449,657 | B2 * | 9/2002 | Stanbach et al. | 709/245 |
| 6,622,174 | B1 * | 9/2003 | Ukita et al. | 709/246 |
| 6,836,792 | B1 * | 12/2004 | Chen | 709/220 |
| 2001/0025254 | A1 * | 9/2001 | Park | 705/14 |
| 2002/0026360 | A1 * | 2/2002 | McGregor et al. | 705/14 |
| 2003/0061566 | A1 * | 3/2003 | Rubstein et al. | 715/500.1 |

OTHER PUBLICATIONS

Hernandez, Raymond, "Promoting Pataki for Speeches, Agency Cites His Ground Zero Role", New York Times, Late Edition—Final ED, col. 01, p. 1, Saturday Oct. 27, 2001.*

Microsoft Press, Computer Dictionary, "The Comprehensive Standard for Business, School, Library, and Home", ©1991, 3 pages.

What is e-mail? A word Definition from the Webopedia Computer Dictionary, http://www.webopedia.com/TERM/e/e_mail.html, retrieved Dec. 8, 2004, 3 pages.

Electronic mail—Wikipedia, the free encyclopedia, http://en.wikipedia.org/wiki/E-mail, retrieved Dec. 9, 2004, 6 pages.

* cited by examiner

SYSTEM FOR GENERATING REVENUE USING ELECTRONIC MAIL AND METHOD FOR ITS USE

This application claims the benefit of U.S. Provisional Patent Application No. 60/196,191, filed Apr. 11, 2000.

BACKGROUND

The Internet is a worldwide system of computer networks operating in a public, cooperative, and self-sustaining manner. Hundreds of millions of people worldwide use the Internet. Internet users may, if they have permission, get information from any other computer which is connected to the Internet. In the vernacular of the Internet, a computer providing services or information to another computer is known as a "server computer." A computer receiving services or information form another computer is known as a "client computer." Transmission of services or information occurs after the server computer and the client computer establish bi-directional communication. The transmission of services or information from a server computer to a client computer is conducted, in most cases, over the currently existing public telecommunications networks. The Internet is distinguished from other forms of telecommunication over the existing public telecommunications network through the use of a set of protocols called Transmission Control Protocol/Internet Protocol ("TCP/IP").

Although it is possible for a business or a consumer to obtain access to the Internet directly from a local personal computer, most businesses, and nearly all consumers, obtain access to the Internet through an entity known as an Internet Service Provider ("ISP"). An ISP possesses hardware, software, and telecommunications network access lines which enable an Internet user to obtain access to the Internet more efficiently, reliably, and economically than would be possible through the user's own resources.

The two most widely used features of the Internet are the World Wide Web (the "Web") and electronic mail ("e-mail"). Together, the Web and e-mail enable persons or entities to use the Internet for the purpose of selling goods and services to other users of the Internet, an activity known as e-commerce or e-business.

The Web comprises the set of Internet server computers which use the Hypertext Transfer Protocol ("HTTP") in conjunction with the TCP/IP protocols to transmit computer files from one computer to another over the Internet. A Web browser is a software program resident on the Internet user's computer that uses HTTP to make requests of Web servers throughout the Internet on behalf of the Internet user who is operating the client computer. Upon receipt of a request from the Web browser, computer files are transferred from a server computer to the Internet user's client computer. The computer files typically are generated using the Hypertext Markup Language ("HTML"), or comparable mark-up language.

E-mail is the exchange of computer messages over the Internet from the computer of one Internet user to the computer of another Internet user, or from the computer of an Internet user to a server computer. E-mail is the most widely used application on the Internet. For example, according to one estimate, in 1998, 3.4 trillion e-mail messages were delivered to 81 million e-mail users in the United States, which is an average of more than 6.5 million messages delivered per minute. For many Internet users, e-mail has replaced the Postal Service and even commercial long distance telephone services for exchanges of communication.

E-mail users acquire the capability to send and receive e-mail according to one of two predominant schemes. In the first (and most common) scheme, electronic mail capability is provided to an electronic mail user by his ISP. According to this scheme, the ISP establishes a "mailbox" for the user on a "mail server" operated by the ISP. A mail server is a server computer configured and programmed to process e-mail. The mailbox comprises hard disk space set aside on a server computer operated by the ISP to store e-mail messages addressed to the user. This e-mail scheme is distinguishable in that it requires a software program known as an "e-mail client" which resides on the user's (client) computer. The e-mail client is operable to access the user's mailbox on the ISP's server computer and retrieve the user's incoming e-mail messages therefrom. The e-mail client also is operable to compose, format, and send e-mail messages to other Internet users. According to this e-mail scheme, e-mail messages are composed and read by the e-mail client on the Internet user's client computer. An e-mail client enables e-mail messages to be composed and read even if the client computer is not in bi-directional communication with the ISP's mail server.

The second predominant e-mail scheme is known as "Web-based e-mail." In this scheme, no e-mail client is required. Instead, after accessing the Internet through the ISP, the Internet user establishes bi-directional communication with a Web site using his Web browser. As was the case in the first e-mail scheme, a mailbox is established for the user on a mail server owned by the Web site operator. To access his/her e-mail, the e-mail user typically is required to enter a user name and password, which enables him/her to open his mailbox and read his/her e-mail messages, or compose and send e-mail messages. Unlike the first e-mail scheme, the client computer must maintain continuous bi-directional communication with the mail server in order to compose and read e-mail messages. Web-based e-mail typically is offered to the user at no additional charge to the user beyond the charges assessed by the ISP for access to the Internet. An example of Web-based e-mail is the service offered by Microsoft Corporation under the brand name HOTMAIL™ (see www.hotmail.msn.com).

The Web essentially is a communication medium. Like other popular communication media, including, for example, broadcast television, cable television, and broadcast radio, the expense incurred by an entity in delivering information over the Internet is offset by revenue from advertisers. The Internet is an attractive medium for advertisers because of the large (and growing) number of users, and because the Internet users typically tend to be more affluent on average than the general population.

It is desired to provide a system and a method whereby revenue may be generated from advertising appended to e-mail messages. It is further desired to provide a system and a method whereby revenue from the advertising appended to e-mail messages can be used to support a charitable organization designated by the e-mail user. When used herein, the term "charitable organization" should be interpreted in its broadest possible sense to include, without limitation, schools as well as arts, religious, and other organizations with a substantially charitable or altruistic mission.

According to the desired system, each e-mail message sent by the e-mail user would have advertising appended to it. In one embodiment, the proceeds from the advertising accrue to the benefit of the operator of such a desired system. In another embodiment, the advertiser, in consideration for the placement of the advertisement on the e-mail message, makes a contribution to a charitable organization designated by the e-mail user. It is further desired that this system and method will work with either predominant e-mail scheme.

Such a system and method could benefit a diverse array of charitable organizations. Many well known charitable organizations, such as the American Cancer Society, the March of Dimes, or the United Way, have well established, wide ranging, and effective contribution solicitation networks, yet these organizations may not be realizing the full possibilities of the Internet as a means of generating contributions. Other, smaller charitable organizations, particularly those at the community level, may not have similarly well organized contribution solicitation networks or the ability to develop them. Such a system and method would be of great benefit to these smaller charitable organizations. Instead of the common fund-raising methods employed by these organizations, such as, for example, direct mail solicitations and direct telephone solicitations, these smaller organizations can adopt a less intrusive method of fund-raising. The charitable organization merely could encourage its patrons to use e-mail, which likely is something the patron would do anyway. Through the use of e-mail, the patron is able to generate for a favorite national, local or community charitable organization, without committing any of his own resources in doing so.

SUMMARY

The present invention comprises a system and a method whereby revenue may be generated from advertising appended to e-mail messages. In one embodiment, the system and method of the present invention are adapted so that revenue from the advertising appended to e-mail messages can be used to support a charitable organization designated by the e-mail user.

According to the present invention, each e-mail message sent by the e-mail user would have advertising appended to it. In one embodiment, the proceeds from the advertising accrue to the benefit of the operator of such a desired system. In another embodiment, the advertiser, in consideration for the placement of the advertisement on the e-mail message, makes a contribution to a charitable organization designated by the e-mail user. The present invention may be used with either predominant e-mail scheme.

During operation of a first embodiment of the present invention, e-mail sent from the e-mail user's e-mail account is routed through a standard e-mail delivery system. The e-mail message is further processed by a processor associated with the database which appends thereto a software means which causes an advertisement to be appear appended to the e-mail message when it is opened by the e-mail recipient. The message opened by the recipient contains the e-mail message composed by the e-mail user, and an advertisement. The advertisement optionally contains a hyperlink to the advertiser's website. Preferably, advertisers pay the entity operating an e-mail system according to the present invention for the opportunity to append their advertisements to the e-mail messages. Revenue generated by the appended advertisements is retained by the entity operating the e-mail system according to the present invention.

During operation of a second embodiment of the present invention, e-mail sent from the e-mail user's e-mail account is routed through a standard e-mail delivery system, and through a database containing codes identifying the designated charitable organization. The e-mail message is further processed by a processor associated with the database which appends thereto a software means which causes an advertisement to be appear appended to the e-mail message when it is opened by the e-mail recipient. The message opened by the recipient contains the e-mail message composed by the e-mail user, a sub-message identifying the charitable organization to which a charitable contribution has been sent or designated, and an advertisement. The advertisement optionally contains a hyperlink to the advertiser's website. In one embodiment, advertisers pay for the opportunity to append their advertisements to the e-mail messages. Revenue generated by the appended advertisements is divided between the charitable organization and the entity operating the e-mail system.

DESCRIPTION

Figure 1:
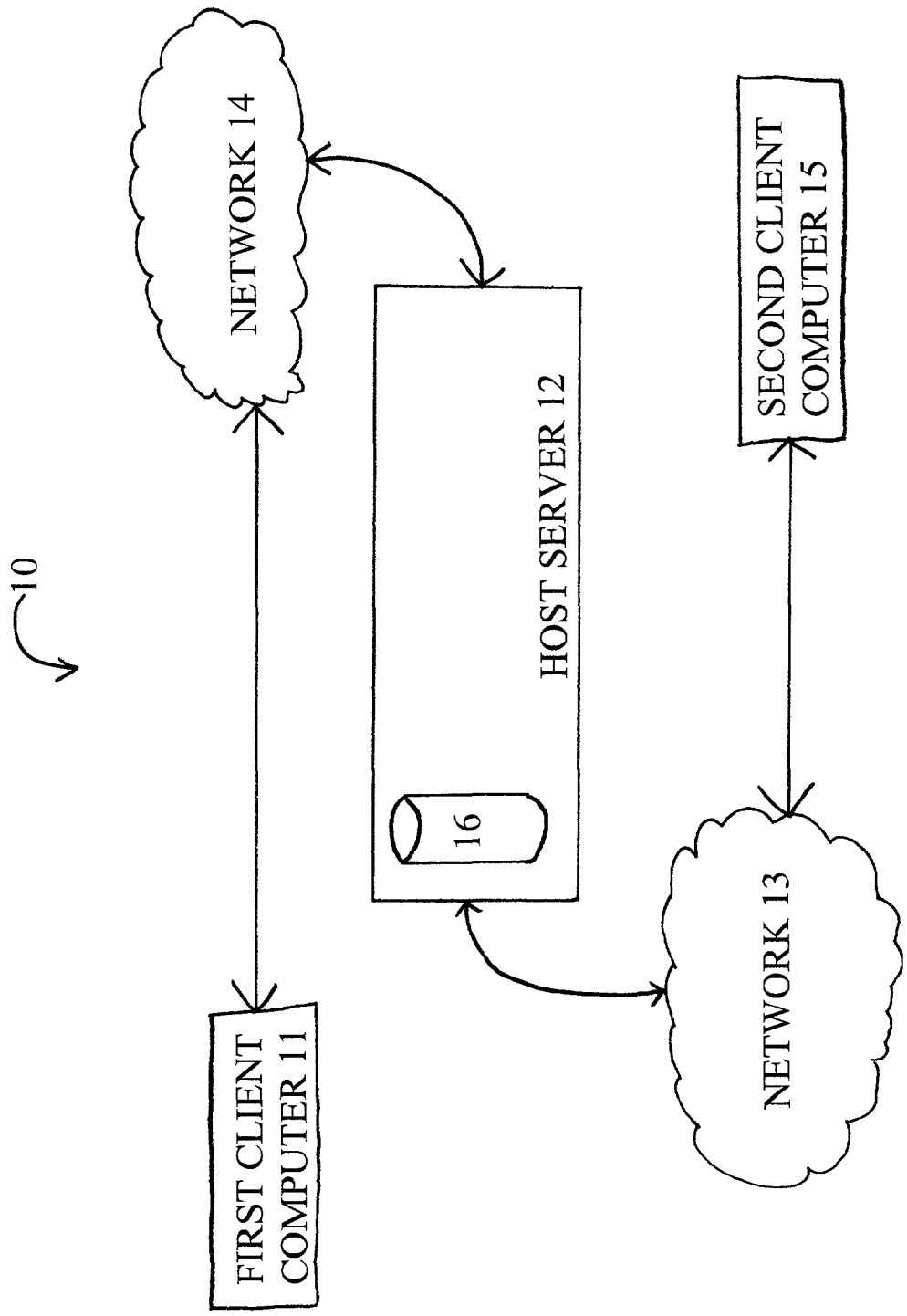
FIG. 1 shows a block diagram of one embodiment of the system of the present invention.

The present invention comprises a system for generating charitable contributions through the use of electronic mail, and a method for use of the system. FIG. 1 shows a block diagram of one embodiment of the system of the present invention. Shown in FIG. 1 is system 10 comprising first client computer 11, host server 12, computer networks 13 and 14, second client computer 15, and database 16.

Host server 12 comprises one or more server computers, computing devices, or systems of a type well known in the art. Host server 12 is operated by, or under the control of, a "system operator," which may be an individual or a business entity. For purposes of clarity, host server 12 is shown in FIG. 1 and referred to herein as a single server. Host server 12 need not, however, be a single server. Host server 12 may comprise a plurality of servers or other computing devices or systems connected by hardware and software means known in the art which collectively are operable to perform the functions allocated to host server 12 according to the present invention. Specifically, host server 12 is operable to be a mail server of a type well-known in the art, as well as an advertisement processing server configured and programmed to carry out the functions allocated to host server 12 according to the present invention.

In the embodiment shown in FIG. 1, database 16 resides on host server 12. Database 16 may, however, reside on a server or computing device remote from host server 12, provided the remote server or computing device is capable of bi-directional electronic communication with host server 12. Preferably, the remote server or computing device upon which database 16 resides is operated by, or under the control of, the system operator. Preferably, the remote server or computing device upon which database 16 resides is electronically connected to host server 12 such that the remote server or computing device is in continuous bi-directional communication with host server 12.

For purposes of clarity, database 16 is shown in FIG. 1 and referred to herein as a single database. It will be appreciated by those of skill in the art that database 16 may comprise a plurality of databases connected by software means, which collectively are operable to perform the functions allocated to database 16 according to the present invention.

For purposes of clarity, computer network 13 and computer network 14 are shown in FIG. 1 as distinct computer networks. Computer network 13 and computer network 14 may, however, comprise the same computer network. In one embodiment, either computer network 13 or computer network 14, or both, comprise a global computer network, such as, for example, the Internet.

First client computer 11 and second client computer 15 are computers, computing devices, or systems of a type well known in the art, such as a mainframe computer, workstation, personal computer, laptop computer, hand-held computer, cellular phone, or personal digital assistant device. First client computer 11 is operated by an e-mail user. Second client computer 15 is operated by an e-mail recipient. For purposes of clarity, only one second client computer 15 is shown in FIG. 1, and the system frequently is discussed herein in terms of a single second client computer 15 operated by a single e-mail user. However, it is within the scope of the present invention, and it will be appreciated by those of skill in the art, that a plurality of second client computers 15 operated by a plurality of e-mail recipients may exist.

If computer network 14 comprises the Internet, resident on first client computer 11 operated by the e-mail user is a software means known in the art for browsing the Internet and operable to interpret and display webpages, such as Microsoft® Internet Explorer™ or Netscap® Communicator®. Resident on, or accessible by, the second client computer 15 operated by the e-mail recipient is a software means known in the art for retrieving e-mail messages from an e-mail mailbox, including software means for viewing e-mail messages, for composing a response to an e-mail message, and for deleting an e-mail message from the e-mail mailbox.

In operation, the e-mail user uses the data entry features of first client computer 11 to compose an e-mail message addressed to at least one e-mail recipient. The data entry features include a keyboard electrically attached to first client computer 11, and a mouse or other pointing device electrically attached to first client computer 11. Data entry may be accomplished or enhanced by other means known in the art such as, for example, a voice recognition data entry means.

According to a first embodiment of the present invention, after the e-mail user is satisfied with the content and the address of the e-mail message, the e-mail user causes the e-mail message to be sent to each e-mail recipient. En route to second client computer 15 operated by the e-mail recipient, the e-mail message is processed by server 12 and database 16. An advertisement processing software means associated with database 16 causes a sub-message to be appended to the e-mail message. The appended sub-message comprises an advertisement retrieval software means which causes an advertisement from an advertiser to be appended to the e-mail message when the e-mail message is opened by each e-mail recipient. Optionally, the appended sub-message comprises the advertisement itself without requiring the appended advertisement retrieval software means. After the sub-message is appended by the advertisement processing software means associated with database 16, the e-mail message with the appended sub-message is delivered through computer network 13 to each e-mail recipient.

According to a second embodiment of the present invention, after the e-mail user is satisfied with the content and the address of the e-mail message, the e-mail user causes the e-mail message to be sent to each e-mail recipient. En route to second client computer 15 operated by the e-mail recipient, the e-mail message is processed by server 12 and database 16. In this second embodiment, an advertisement processing software means associated with database 16 causes a first and a second sub-message to be appended to the e-mail message. The first appended sub-message comprises the identity of a charitable organization to which a charitable contribution is made as a result of delivery of the e-mail message to the e-mail recipient. The second appended sub-message comprises an advertisement retrieval software means which causes an advertisement from an advertiser to be appended to the e-mail message when the e-mail message is opened by the e-mail recipient. Optionally, the second appended sub-message comprises the advertisement without requiring the appended advertisement retrieval software means. After the two sub-messages are appended by the advertisement processing software means associated with database 16, the e-mail message with the two appended sub-messages is delivered through computer network 13 to each e-mail recipient.

According to the first embodiment of the present invention, a first and a second preliminary activity must be accomplished for this embodiment of the system to operate in the intended manner. The first preliminary activity comprises establishing an e-mail account for the e-mail user with the system operator. The second preliminary activity comprises establishing an agreement between the system operator and each advertiser desiring to append advertising to e-mail messages according to the present invention. At least one advertiser with at least one advertisement is required.

According to the second embodiment of the present invention a first, a second, and a third preliminary activity must be accomplished for this embodiment of the system to operate in the intended manner. As before, the first preliminary activity comprises establishing an e-mail account for the e-mail user with the system operator. However, in this second embodiment, designated in the e-mail account established for the e-mail user is at least one charitable organization to whom charitable contributions is made through the operation of this embodiment of the present invention.

As in the first embodiment, in the second embodiment of the present invention the second preliminary activity also comprises establishing an agreement between the system operator and each advertiser desiring to append advertising to e-mail messages according to the present invention. At least one advertiser with at least one advertisement is required. The third preliminary activity according to this second embodiment of the present invention comprises establishing an agreement between the system operator and each charitable organization to whom charitable contributions is made through the operation of the present invention. At least one charitable organization is required. In one implementation of the second embodiment of the present invention, the preliminary activity comprising establishing an agreement between the system operator and a charitable organization is not required, however. According to this implementation, any charitable organization designated by the e-mail user may receive charitable contributions through the operation of the present invention.

Figure 2:
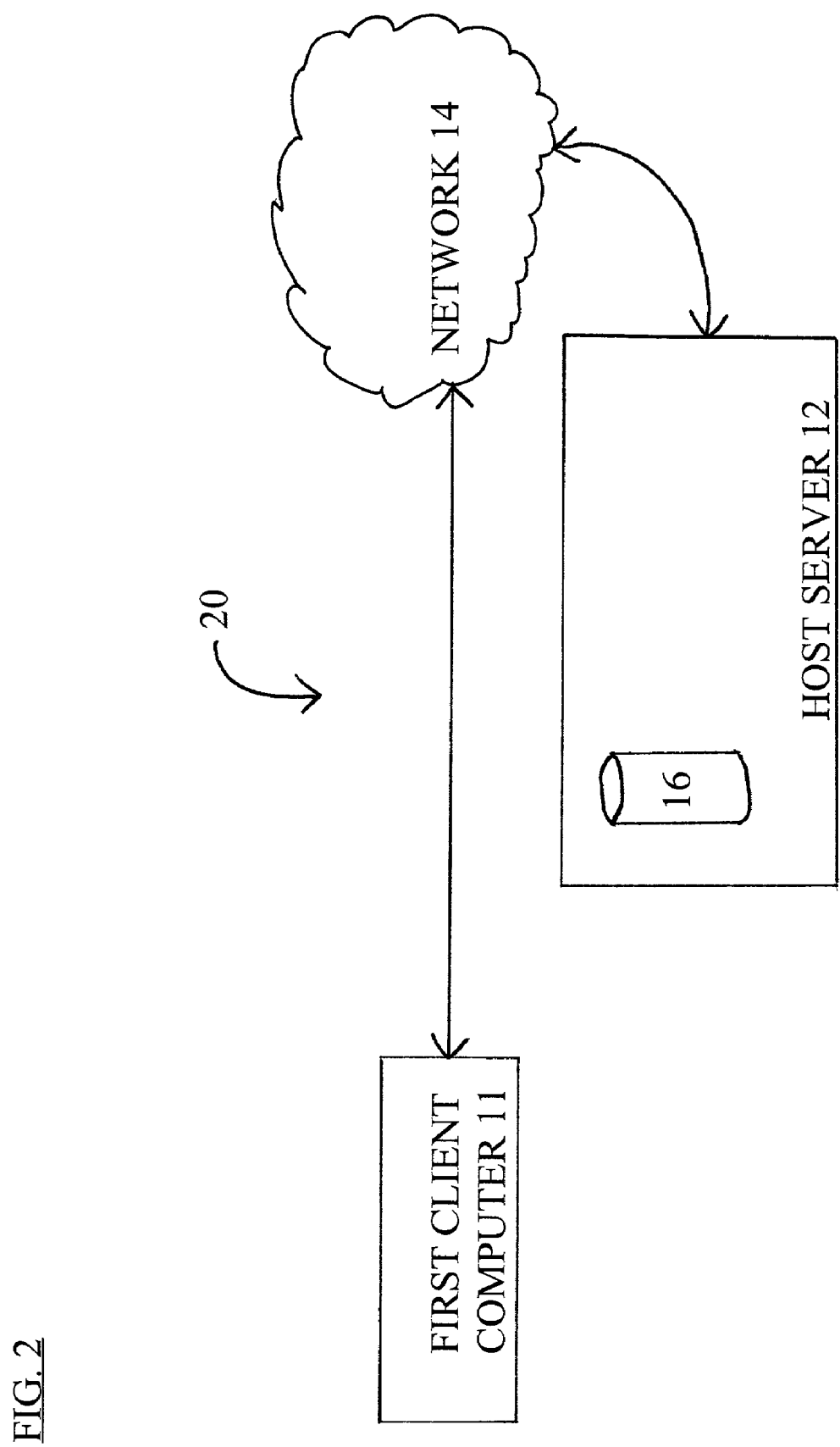
FIG. 2 shows a block diagram of one embodiment of the system of the present invention used to establish an e-mail account with the system operator according to the present invention.

FIG. 2 shows a block diagram of one embodiment of a system used to establish an e-mail account with the system operator. The account establishment system shown in FIG. 2 may be used with either the first embodiment or the second embodiment of the present invention. Shown in FIG. 2 are account establishment system 20 comprising first client computer 11 operated by the e-mail user, computer network 14, and host server 12. In the example shown in FIG. 2, computer network 14 comprises the Internet, but this is not required.

During operation of the account establishment system, first client computer 11 operated by the e-mail user enters into bi-directional communication with host server 12. Bi-directional communication is achieved by means known in the art for communication over the Internet such as, for example, communication in accordance with TCP/IP, HTTP, the file transfer protocol ("FTP"), the wireless access protocol ("WAP"), and/or other communication protocols known in the art.

The e-mail user finds a first Uniform Resource Locator ("URL") address, which is the URL address of a first webpage stored on host server 12. As used herein, the term "webpage" means a computer file which is transmitted from a first computer acting as a server over a computer network to a second computer acting as a client computer. At the client computer, the webpage is interpreted by a software means residing on the client computer causing the webpage to be displayed on the client computer's video display terminal. A webpage may comprise an electronic form or electronic document. As used herein, "electronic form" comprises a webpage including at least one data entry field for the customer to fill with data. As used herein, an "electronic document" comprises a webpage with no data entry fields.

The software means residing on the first client computer 11 operated by the e-mail user sends an electronic request containing the URL address of a desired webpage stored on host server 12 over computer network 14. Such electronic request is interpreted by computer network 14, which processes such request to result in connection to server 12 as identified by its URL address. At this point, first client computer 11 is in bi-directional communication with host server 12. Host server 12 then causes the desired webpage to be sent over computer network 14 for receipt by first client computer 11. The desired webpage then is displayed on the video display terminal of first client computer 11. If the webpage comprises an electronic form, data entered by the e-mail user at first client computer 11 then is transmitted to and received by host server 12, with host server 12 responding to such data according to the software means residing thereon.

It will be appreciated by those of skill in the art that other means may be used for establishing bi-directional communication between first client computer 11 and host server 12. For example, first client computer 11 may be in bi-directional communication with a second server computer having a hyperlink to the URL address of a webpage stored on host server 12. Selection of the hyperlink by the e-mail user using the data entry features of first client computer 11 results in bi-directional communication between first client computer 11 and host server 12. It also will be appreciated that the bi-directional communication between first client computer 11 and host server 12 may occur over one or more types of media, including but not limited to the commercial telephone network, the commercial Internet backbone, wireless communications media, coaxial cable, fiber optic cable, and the like.

Figure 3:
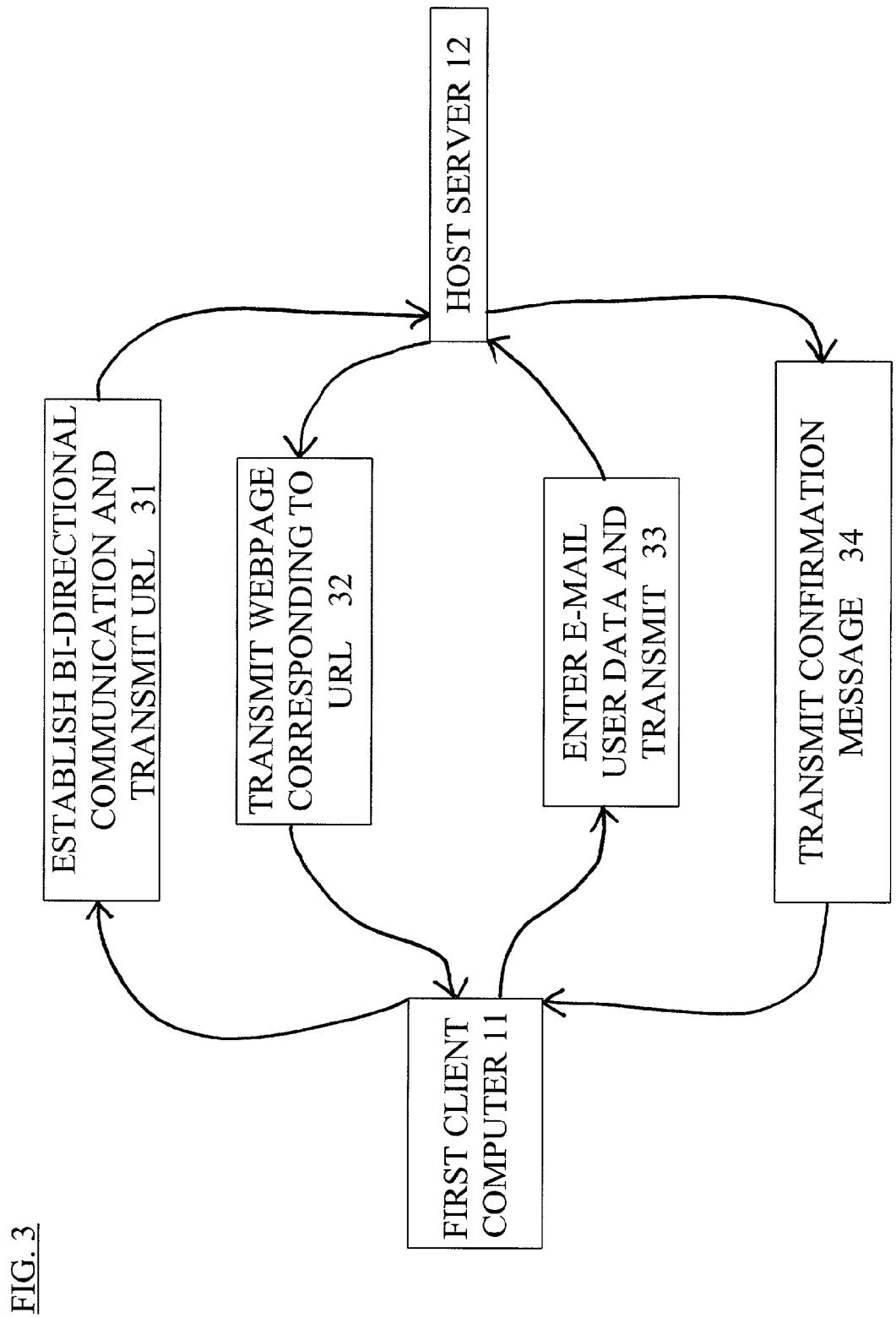
FIG. 3 shows a flow chart of one embodiment of the method used to establish the e-mail user's e-mail account according to the present invention.

FIG. 3 shows a flow chart of one embodiment of the process used to establish the e-mail account for the e-mail user. The account establishment process shown in FIG. 3 may be used with either the first embodiment or the second embodiment of the present invention. Shown in FIG. 3 are first client computer 11 operated by the e-mail user, and host server 12. First client computer 11 is in bi-directional communication with host server 12. The e-mail account of the e-mail user is established according to the steps shown in blocks 31, 32, 33, and 34. In block 31, the e-mail user communicates his/her intent to establish an e-mail account with the system operator by establishing bi-directional communication between first client computer 11 and host server 12, and by transmitting to host server 12 the URL of a webpage comprising an electronic form, the submission of which is required by the system operator to establish the e-mail account. In response, at block 32 host server 12 transmits the webpage corresponding to the URL over computer network 14 to first client computer 11. At block 33, the e-mail user enters "e-mail user data" into the electronic form using the data entry features of first client computer 11, and then causes the electronic form comprising the e-mail user data to be transmitted over computer network 14 to host server 12. Upon receipt of the electronic form comprising the e-mail user data, host server 12 establishes a record in database 16 comprising the e-mail user data and, at block 34, transmits a webpage over computer network 14 to first client computer 11, the webpage comprising an electronic document confirming that the e-mail account of the e-mail user is ready for use.

Although a bi-directional, interactive session between first client computer 11 and host server 12 is shown in FIG. 3 as comprising the process used to establish the e-mail account of the e-mail user, such a process is not required to be so comprised and still be within the scope of the invention. Other means of transmitting the e-mail user data to the system operator may be used. For example, the e-mail user may correspond with a representative of the system operator, and thereby transmit the e-mail user data to the system operator, in a face-to-face meeting, by wired or wireless telephonic means, or by other conversational means. Alternatively, the e-mail user may complete a paper form provided by the system operator, and submit the paper form to the system operator by a postal means or by facsimile.

Design of the electronic form transmitted from host server 12 to first client computer 11 in block 32 is left to the discretion of the system operator; however, the following data is required in each embodiment of the present invention: (1) data sufficient to identify the e-mail user; (2) data designating a user identifier ("User ID") unique to the e-mail user; and (3) data designating a Password to be used in conjunction with the User ID. According to the second embodiment of the present invention, data sufficient to identify the charitable organization designated by the e-mail user to receive charitable contributions also is required.

Figure 4:
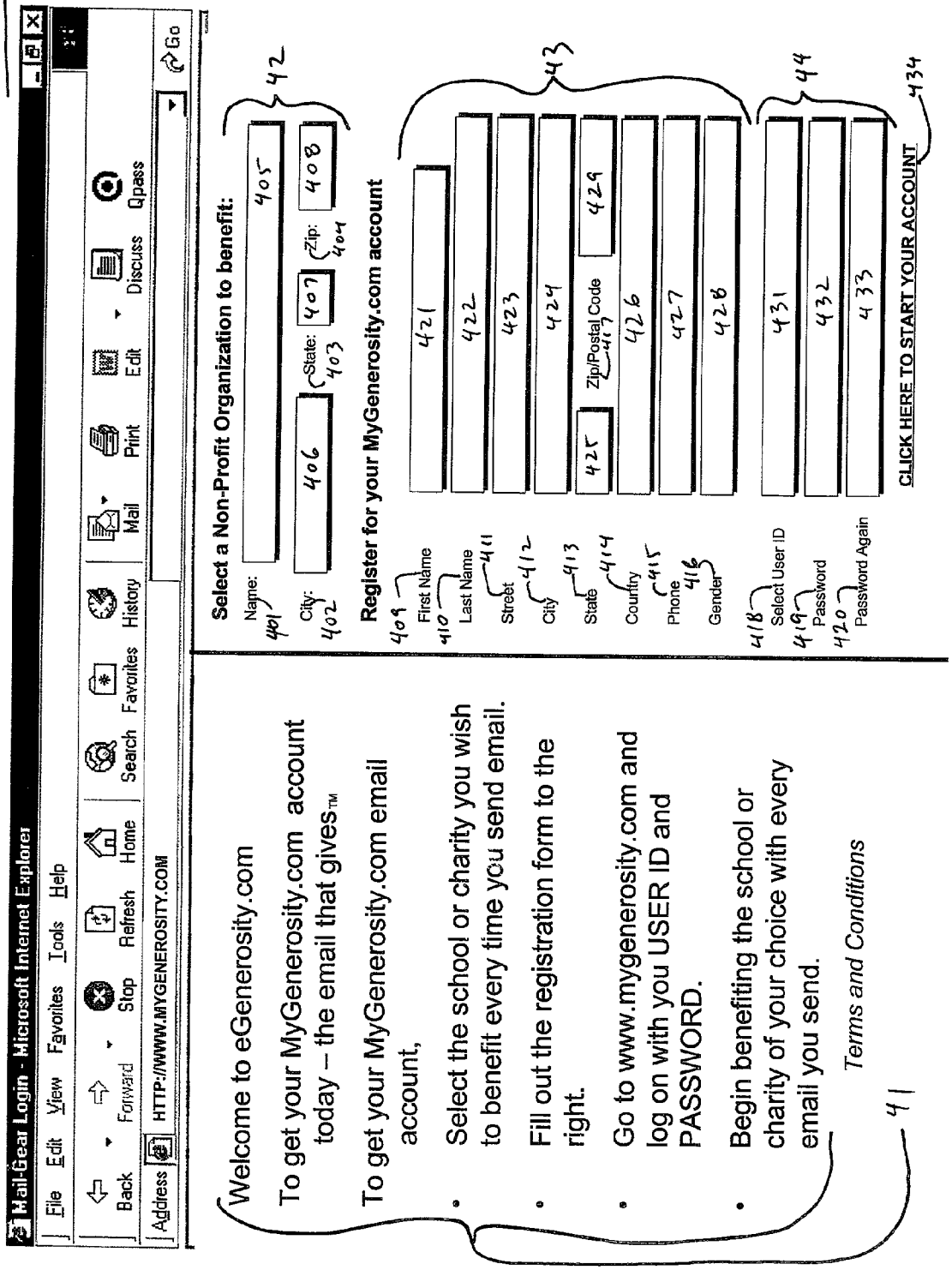
FIG. 4 shows a pictorial view of an electronic form which may be transmitted from the host server to the e-mail user's computer to collect data necessary to establish the e-mail user's e-mail account according to the present invention.

FIG. 4 shows a pictorial view of an exemplary electronic form which may be transmitted from host server 12 to first client computer 11 in block 32 of FIG. 3, according to one alternative implementation of the second embodiment of the present invention. FIG. 4 is divided into section 41, section 42, section 43, and section 44. Section 41 comprises a list of instructions to be followed by the e-mail user in order to establish the e-mail account with the system operator. Section 42 comprises a plurality of data requests and a plurality of data entry fields for the e-mail user to designate a charitable organization to receive the charitable contributions generated by the e-mail messages of the e-mail user. Section 43 comprises a plurality of data requests and a plurality of data entry fields for host server 12 to capture the information required by host server 12 to establish the e-mail account for the e-mail user. Section 44 comprises a plurality of data requests and a plurality of data entry fields necessary for host server 12 to capture the unique User ID and Password to be used by the e-mail user.

Shown in section 42 are data request "Name" 41, data request "City" 402, data request "State" 402, and data request "Zip" 404. Also shown in section 42 are data entry fields 405 through 408, corresponding to data requests 401 through 404, respectively. Other embodiments of the present invention may use more, fewer, or different data requests to designate a charitable organization. In operation, the e-mail user responds to the foregoing data requests by entering appropriate data into the data entry fields. The charitable organization designated by the e-mail user in section 42 preferably is one which previously or concurrently has established an agreement with the system operator as discussed hereinafter, but this is not required. According to another embodiment of the present invention, any charitable organization may be designated by the e-mail user to receive charitable contributions.

Shown in section 43 are data request "First Name" 409, data request "Last Name" 410, data request "Street" 411, data request "City" 412, data request "State" 413, data request "Country" 414, data request "Phone" 415, data request "Gender" 416, and data request "Zip/Postal Code" 417. Also shown in section 43 are data entry fields 421 through 429, corresponding to data requests 409 through 417, respectively. Other embodiments of the present invention may use more, fewer, or different data requests to capture the information required by host server 12 to establish the e-mail account for the e-mail user. In operation, the e-mail user responds to the foregoing data requests by entering the appropriate data into the data entry fields using the data entry features of first client computer 11.

Shown in section 44 are data request "Select User ID" 417, data request "Password" 418, and data request "Password Again" 419. Also shown in section 43 of FIG. 4 are data entry fields 431 through 433, corresponding to data requests 417 through 419, respectively. In operation, the e-mail user responds to the foregoing data requests by entering the appropriate data into the data entry fields using the data entry features of first client computer 11. Preferably, the User ID entered into data entry field 431 is not identical to the User ID of another e-mail account holder stored in database 16. Preferably, a software means residing on host server 12 is operable to compare the User ID selected by the e-mail user to previously existing User ID's in database 16, to return an error message if the User ID selected by the e-mail user exists in database 16, and to request a different User ID from the e-mail user.

Preferably, the data entered into data entry field 432 is identical to the data entered into data entry field 433. Preferably, the data entered into data entry field 432 and the data entered into data entry field 433 are never displayed on the computer's video display terminal.

Also shown in FIG. 4 is hyperlink 434, labeled "CLICK HERE TO START YOUR ACCOUNT." Clicking on hyperlink 434 starts the activity comprising block 33 of FIG. 3. As the label suggests, when the e-mail user points to hyperlink 434 and clicks thereon using a mouse or other pointing device electrically attached to first client computer 11, the e-mail user data is delivered to host server 12, and host server 12 is instructed to cause an e-mail account in the name of the e-mail user to be established in database 16. Host server 12 accomplishes the establishment of the e-mail account of the e-mail user in database 16 by software means known in the art for inserting a record into a database and for activating an e-mail account.

Those of skill in the advertising art will appreciate that an advertisement is more effective when distributed to those having an interest in the products, services, or information comprising the subject matter of the advertisement. Thus, a system for generating revenue from the distribution of advertisements such as the present invention is more effective for the advertiser, and possibly more profitable for the system operator, if the system is able to direct an advertisement for distribution to those having an interest in the subject matter of the advertisement.

Those of skill in the art also will appreciate the concept of "social networking." According to this concept, individuals having shared preferences, tastes, and interests seek out each other and form relationships, pursuant to which they can communicate regarding their shared preferences, tastes, and interests.

In at least one embodiments, the present invention comprises an adaptation of the concept of social networking. In this at least one embodiment, the e-mail user data stored in database 16 comprises a "profile" of the e-mail user. The profile of the e-mail user comprises information about the e-mail user's preferences, tastes, and interests. In accordance with the concept of social networking, the e-mail recipients with whom the e-mail user communicates via e-mail are likely to possess preferences, tastes, and interests having commonality with the e-mail user's preferences, tastes, and interests. Advertisements for products, services, or information which are likely to appeal to the e-mail user according to the e-mail user's profile, therefore also are likely to appeal to the e-mail recipients. Thus, according to the present invention, advertisements may be selected for appending to the e-mail user's e-mail messages according to the e-mail user's profile. The effectiveness of the advertising thereby may be enhanced and the system operator may achieve greater revenue and profitability.

The e-mail user's profile may be compiled in database 16 from several sources. For example, when an e-mail user establishes an e-mail account, the e-mail user may complete a survey providing information about the e-mail user's preferences, tastes, and interests. In addition, as the e-mail user performs actions on the Internet, such as, for example, online ordering of goods/services or banner advertisement click-throughs, these actions may be compiled and categorized within the e-mail user's profile in database 16, with a running total compiled for activities in each category. For example, if the e-mail user selects a hyperlink to look at women's shoes for sale on another website, the running totals of interest in the each of the shoes category and woman's apparel category in the e-mail user's profile may be incremented.

The e-mail user's profile also may be compiled as e-mail messages are sent by the e-mail user according to the present invention. A software means associated with host server 12 and database 16 may be provided which scans each e-mail message for the presence of predefined "keywords," such as, for example, computer, football, movie, music, etc. The presence of each predefined keyword in an e-mail message is compiled within the e-mail user's profile in database 16.

A "keyword" comprises a word, group of words, or a phrase which suggests a preference, taste, or interest of the e-mail user. Preferably, the keywords are selected and defined so that the presence of a keyword or a combination of keywords in an e-mail user's profile, when compiled over time, correlates positively to the presence of an e-mail user's preferences, tastes, and interests to which the advertisers wish to appeal. Optionally, keywords are selected and defined in consultation with advertisers. An embodiment of the present invention in which keywords are used in compiling the e-mail user's profile, and then used in selecting advertisements for distribution with the e-mail messages sent by the e-mail user, is known as a "keyword-enabled" embodiment.

Figure 5:
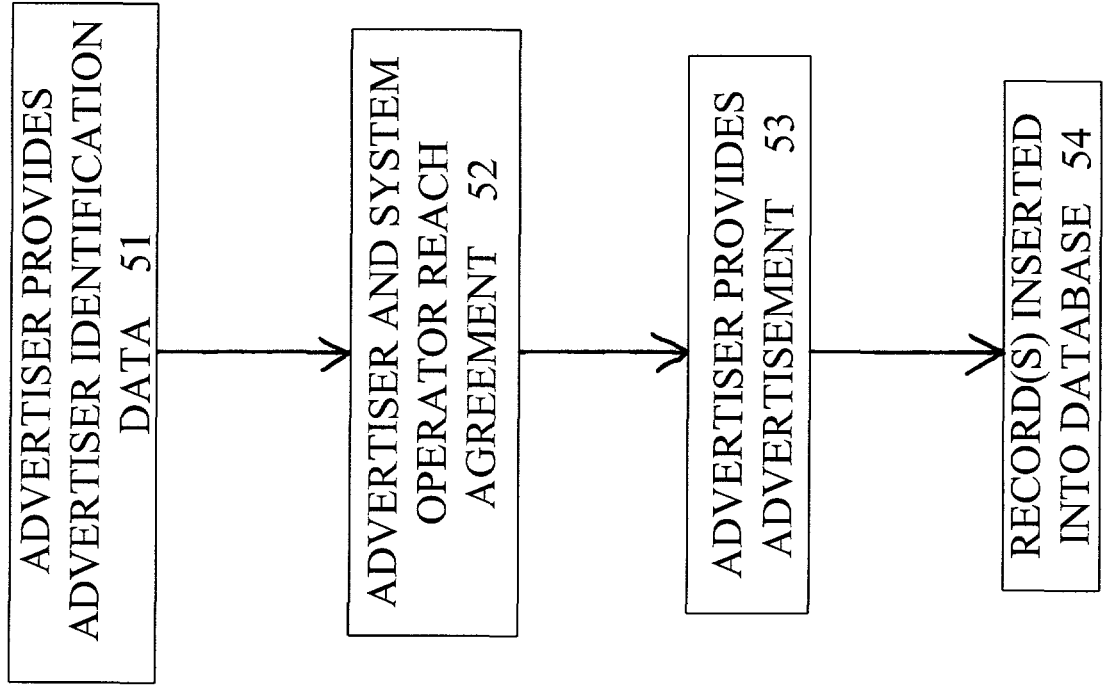
FIG. 5 shows a flow chart of one embodiment of the method used to establish an agreement between the system operator and an advertiser according to the present invention.

The second preliminary activity to be accomplished before the e-mail user may send e-mail messages according to the present invention comprises establishing an agreement between the system operator and at least one advertiser which provides at least one advertisement to be appended to the e-mail messages generated according to the present invention. Shown in FIG. 5 is a flow chart showing one embodiment of a process of establishing the agreement between the system operator and the advertiser comprising four steps. The advertiser agreement establishment process shown in FIG. 5 may be used with either the first embodiment or the second embodiment of the present invention.

In block 51 of FIG. 5, the advertiser provides data identifying the advertiser (the "advertiser identification data") to the system operator by a means known in the art for transmitting data from one entity to a second entity. The advertiser identification data may be provided in the form of an application. If an application is used, the application may be submitted by one of several means known in the art for submitting an application. For example, the application may be submitted during a bi-directional, interactive session between the computer operated by a representative of the advertiser and a computer or server operated by the system operator or by a representative of the system operator. In another example, the representative of the advertiser may correspond with a representative of the system operator, and thereby transmit the application to the system operator, in a face-to-face meeting, by wired or wireless telephonic means, or by other conversational means. Alternatively, the representative of the advertiser may complete a paper application form provided by the system operator, and submit the paper form to the system operator by a postal means or by facsimile.

The advertiser identification data to be collected by the system operator according to a particular implementation of the present invention may be determined at the discretion of the system operator. The advertiser identification data must be sufficient for the system operator to identify the advertiser, and may include, for example, the name and address of the advertiser, and the name, address, telephone number, and e-mail address of a representative of the advertiser who serves as a point-of-contact for the system operator.

Shown in block 52 of FIG. 5 is the second step in establishing the agreement between the advertiser and the system operator. The second step comprises establishing an oral or written contract between the system operator and the advertiser comprising the terms and conditions which govern the relationship between the system operator and the advertiser. The terms and conditions agreed to by a system operator and a first advertiser need not be identical to the terms and conditions agreed to by a system operator and a second advertiser. An essential element of every such contract according to the present invention is that the parties must agree on a fee or a schedule of fees to be paid by the advertiser for each instance where the advertiser's advertising message is delivered to an e-mail recipient according to the present invention.

In block 53, the advertiser, having entered into a contract with the system operator, provides the system operator with at least one advertising message which to be appended to e-mail messages according to the present invention.

Shown in block 54 is the final step of the process of establishing the advertiser. In block 54, the system operator uses a software means known in the art for inserting a record into a database to insert into database 16 at least one database record comprising all or a portion of the advertiser identification data, the advertiser's at least one advertising message, the fee or the schedule of fees to be paid by the advertiser to the system operator, a unique code assigned to the advertiser by the system operator which further identifies the advertiser to the system, and a unique code assigned to each of the advertiser's at least one advertising messages by the system operator which further identifies each of the at least one advertising messages to the system. Each of these unique codes may be an alphabetical code, a numeric code, or an alphanumeric code. Optionally, each of these unique code may be automatically generated by a software means included in or associated with the database record insertion software means.

Once the at least one database record comprising the advertiser identification data and the advertiser's unique code is inserted into database 16, additional advertisements may be added to database 16 at a later point in time and related within database 16 to the advertiser by, for example, the use of the advertiser's unique code. Thus, the process shown in FIG. 5 does not have to be repeated in its entirety for each new advertisement provided by the advertiser.

The advertiser may further specify "target characteristics," which are recorded in database 16. Target characteristics comprise the preferences, tastes, or interests desired by the advertiser in the e-mail recipients receiving the advertiser's advertisements. In accordance with the concept of social networking, the e-mail recipients with whom the e-mail user communicates via e-mail are likely to possess preferences, tastes, and interests having commonality with the e-mail user's preferences, tastes, and interests. Thus, target characteristics also comprise information about the e-mail user's preferences, tastes, and interests which exists in the e-mail user's profile. The target characteristics are associated with the advertiser's advertisements and are used by the present invention to select advertisements for appending to the e-mail messages sent by the e-mail user. The target characteristics may be specified by the advertiser to be associated with all advertisements provided by the advertiser, or to be associated with a particular advertisement provided by the advertiser.

If the embodiment of the present invention is a keyword-enabled embodiment, the advertiser may specify one or more keywords, which are recorded in database 16. The keywords are associated with the advertiser's advertisements and are used by the keyword-enabled embodiment of the present invention to select advertisements for appending to the e-mail messages sent by the e-mail user. The keywords may be specified by the advertiser to be associated with all advertisements provided by the advertiser, or to be associated with a particular advertisement provided by the advertiser. The keywords preferably are specified by the advertiser so that the presence of a keyword or a combination of keywords in an e-mail user's profile correlates positively to the presence of preferences, tastes, and interests of the e-mail recipients to which the advertiser wishes to appeal.

The third preliminary activity to be accomplished before the e-mail user may send e-mail messages according to the second embodiment of the present invention comprises establishing an agreement between the system operator and at least one charitable organization to receive the contributions generated by the e-mail messages. Shown in FIG. 6 is a flow chart showing one embodiment of a process of establishing the agreement between the system operator and the charitable organization comprising three steps.

Figure 6:
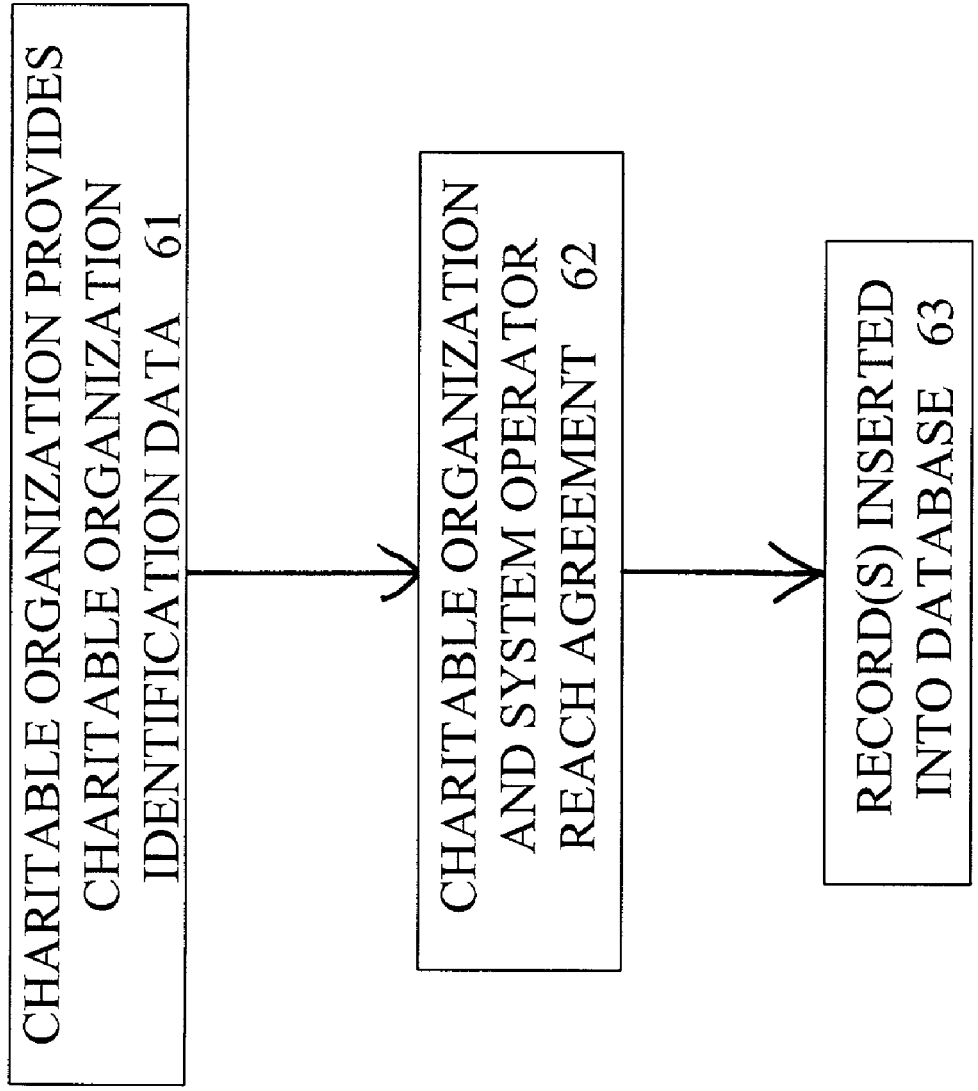
FIG. 6 shows a flow chart of one embodiment of the method used to establish an agreement between the system operator and the charitable organization according to the present invention.

In block 61 of FIG. 6, the charitable organization provides data identifying the charitable organization (the "charitable organization identification data") to the system operator by a means known in the art for transmitting data from one entity to a second entity. The charitable organization identification data may be provided in the form of an application. If an application is used, the application may be submitted by one of several means known in the art for submitting an application. For example, the application may be submitted during a bi-directional, interactive session between a computer operated by a representative of the charitable organization, and a computer or server operated by the system operator or by a representative of the system operator. In another example, the representative of the charitable organization may correspond with a representative of the system operator, and thereby transmit the application to the system operator, in a face-to-face meeting, by wired or wireless telephonic means, or by other conversational means. Alternatively, the representative of the charitable organization may complete a paper application form provided by the system operator, and submit the paper form to the system operator by a postal means or by facsimile.

The charitable organization identification data to be collected by the system operator according to a particular implementation of the present invention may be determined at the discretion of the system operator. The charitable organization identification data must be sufficient for the system operator to identify the charitable organization, and may include, for example, the name and address of the organization, and the name, address, telephone number, and e-mail address of a representative of the charitable organization who serves as a point-of-contact for the system operator. The system operator optionally may wish to collect information objectively confirming the organization's status as a charitable organization.

Shown in block 62 of FIG. 6 is the second step in establishing the agreement between the charitable organization and the system operator. The second step comprises establishing an oral or written contract between the system operator and the charitable organization comprising the terms and conditions which govern the relationship between the system operator and the charitable organization. The terms and conditions agreed to by a system operator and a first charitable organization need not be identical to the terms and conditions agreed to by a system operator and a second charitable organization. An essential element of every such contract according to the present invention is that the parties must agree on a percentage of charitable contributions generated by the present invention which is retained by the system operator in the form of a fund-raising fee.

Shown in block 63 of FIG. 6 is the final step of the process of establishing the agreement with the charitable organization. In block 63, the system operator uses a software means known in the art for inserting a record into a database to insert into database 16 a database record comprising all or a portion of the charitable organization identification data, the fund-raising fee percentage to be retained by the system operator, and a unique code assigned to the charitable organization by the system operator which further identifies the charitable organization to the system. The unique code may be an alphabetical code, a numeric code, or an alphanumeric code. Optionally, the unique code may be automatically generated by a software means included in or associated with the database record insertion software means.

In one implementation of the second embodiment of the present invention, the preliminary activity comprising establishing an agreement between the system operator and a charitable organization is not required. According to this implementation, any charitable organization designated by the e-mail user may receive charitable contributions through the operation of the present invention. Where the e-mail user designates a charitable organization which previously or concurrently has not established an agreement with the system operator, the system operator collects the charitable organization identification data from sources known in the art by means known in the art. For example, the charitable organization identification data may be obtained from publicly available sources such as Internet websites or publicly available databases including, for example, the Internal Revenue Service website (www.irs.gov), Federal and State Departments of Education, and commercially available mailing lists. The charitable organization identification data to be collected by the system operator according to a particular implementation of the present invention may be determined at the discretion of the system operator. The charitable organization identification data must be sufficient for the system operator to identify the charitable organization. The system operator optionally may wish to collect information objectively confirming the organization's status as a charitable organization.

According to this implementation of the second embodiment of the present invention, no contract comprising a fund-raising fee is established between the system operator and the charitable organization. The system operator may use its discretion to determine a percentage of charitable contributions generated by the present invention which is retained by the system operator in the form of a fund-raising fee.

Finally, according to this implementation of the second embodiment of the present invention, the system operator uses a software means known in the art for inserting a record into a database to insert into database 16 a database record comprising all or a portion of the charitable organization identification data, the fund-raising fee percentage to be retained by the system operator, and a unique code assigned to the charitable organization by the system operator which further identifies the charitable organization to the system. The unique code may be an alphabetical code, a numeric code, or an alphanumeric code. Optionally, the unique code may be automatically generated by a software means included in or associated with the database record insertion software means.

Figure 7A:
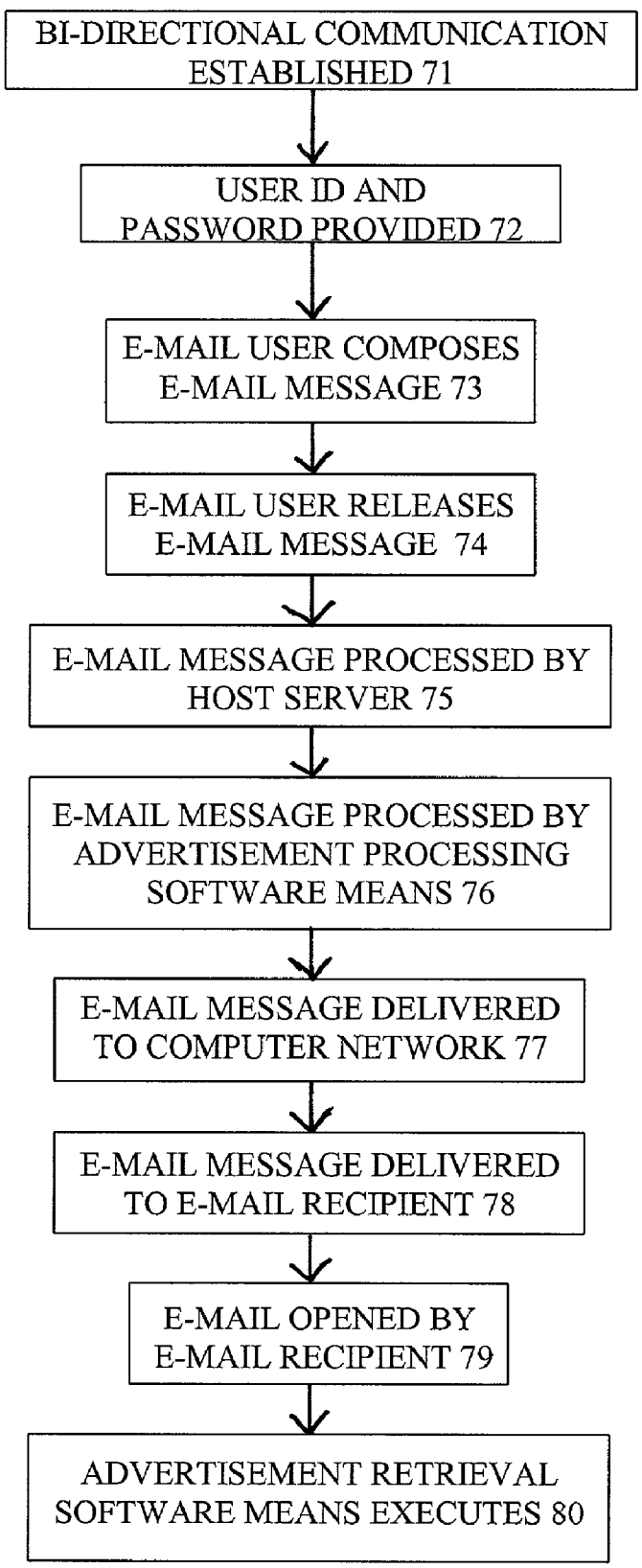
FIG. 7A shows a flow chart of the operation of one embodiment of the method for sending an e-mail message according to the present invention.

After the e-mail account of the e-mail user has been established, and the database record(s) for the advertiser have been established, the user may send e-mail messages appended with advertising according to the first embodiment of the present invention. FIG. 7A shows a flow chart of the operation of one implementation of the method for sending e-mail messages appended with advertising according to the first embodiment of the present invention. In this first embodiment, e-mail messages are transmitted by the e-mail user according to the Web-based e-mail scheme. According to this e-mail scheme, the e-mail user does not require e-mail client software residing on first client computer 11. Instead, if the e-mail user has established an e-mail account with the system operator, then while bi-directional communication exists between host server 12 and first client computer 11, through interaction between the Web browser software means on first client computer 11 and software means resident on host server 12, the e-mail user may accomplish functions common to many e-mail systems known in the art. For example, the e-mail user may compose messages, send messages, read messages, forward messages, delete messages, and perform other well-known e-mail functions.

In FIG. 7A, at block 71 the e-mail user establishes bi-directional communication between first client computer 11 and host server 12, resulting in host server 12 transmitting over computer network 14 a webpage to be displayed on the video display terminal of first client computer 11. The webpage comprises an electronic form into which the e-mail user enters data comprising a User ID and Password. Preferably, the data comprising the Password is never displayed on the video display terminal of first client computer 11. At block 72, the e-mail user enters into the displayed webpage the User ID and Password of the e-mail user, which information subsequently is transmitted to host server 12. Upon receipt, host server 12 compares the User ID and Password submitted by the e-mail user with the User ID and Password provided by the e-mail user when he/she established his/her e-mail account. If the User ID and Password provided by e-mail user 11 at block 72 match the User ID and Password provided by e-mail user 11 when he/she established his/her e-mail account, the e-mail user is permitted to access his/her e-mail account. Although not shown in FIG. 7A, after the e-mail user establishes bi-directional communication between first client computer 11 and host server 12, the e-mail user may perform maintenance activities on his/her e-mail user data stored in database 16. For example, the e-mail user may change his/her address or telephone number.

When the e-mail user composes e-mail messages, such as at block 73 of FIG. 7A, the e-mail user does so according to methods well known in the art. The e-mail message comprises two component parts: a header part and a body part. The header part comprises e-mail address of the e-mail user, the e-mail address of at least one e-mail recipient, and the subject of the message. The body part comprises the textual and/or pictorial message to be transmitted to the at least one e-mail recipient.

When the e-mail user is satisfied with the contents of the header part of the e-mail message and with the contents of the body part of the e-mail message, he/she may instruct the e-mail system to transmit the message to each e-mail recipient. The act of releasing the e-mail message to be routed to each e-mail recipient is shown at block 74.

At block 75, the e-mail message is processed by host server 12 acting as a mail server. Host server 12 processes the e-mail message according to an e-mail protocol known in the art such as, for example, the Simple Mail Transfer Protocol ("SMTP"). Optionally, host server 12 may process the e-mail message according to the X.400 protocol or another e-mail protocol known in the art in lieu of SMTP.

At block 76, the e-mail message is processed by an advertisement processing software means associated with database 16 and host server 12. During this step, the advertisement processing software means causes an advertisement retrieval software means to be appended to the e-mail message. The advertisement retrieval software means is operable, when the e-mail message is opened by each e-mail recipient, to cause the advertisement to be appended to the e-mail message.

Figure 10:
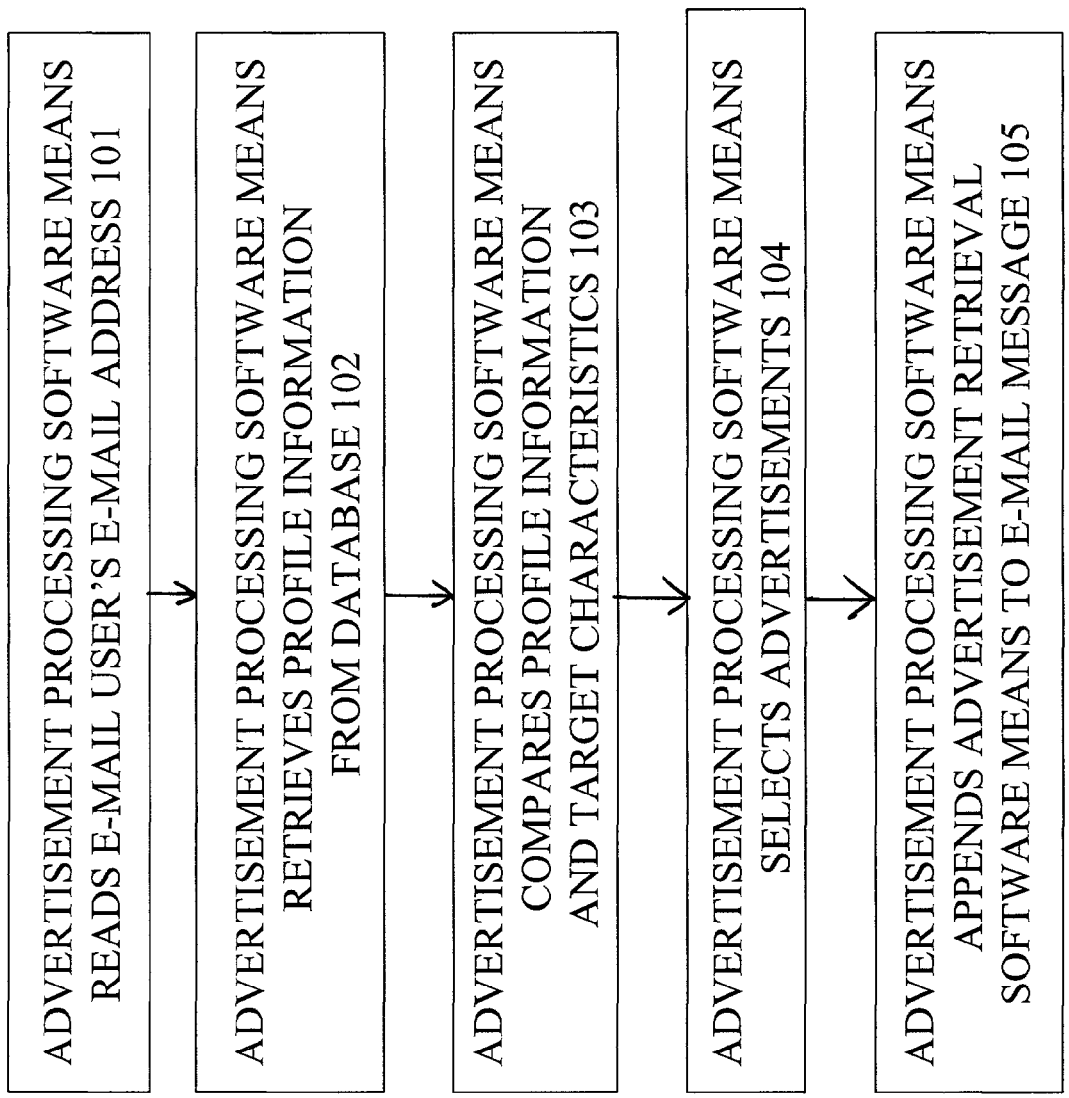
FIG. 10 shows a flow chart illustrating the operation of one implementation of the advertisement processing software means according to the present invention.

FIG. 10 shows a flow chart illustrating the operation of one implementation of the advertisement processing software means. In FIG. 10, at block 101, the advertisement processing software means reads the e-mail address of the e-mail user sending the e-mail message. At block 102, the advertisement processing software means uses the e-mail address to retrieve profile information about the e-mail user from database 16. At block 103 of FIG. 10, the advertisement processing software means compares the e-mail user's retrieved profile information against the target characteristics associated with the advertisements stored in database 16. At block 104, the advertisement processing software means selects an advertisement from database 16. Preferably, comparison of the e-mail user's retrieved profile information against the target characteristics associated with the advertisements stored in database 16 in block 103 reveals that one or more advertisements in database 16 comprise target characteristics corresponding to the e-mail user's profile. The advertisement then may be selected at block 104 from among these one or more advertisements. Where the comparison of the e-mail user's retrieved profile information against the target characteristics associated with the advertisements stored in database 16 reveals that a plurality of advertisements in database 16 comprise the target characteristics corresponding to the e-mail user's profile, the advertisement to be appended to the e-mail message may be selected from among this plurality of advertisements according to one of several possible methods. For example, a first in, first out method of selecting the advertisement may be used. Alternatively, a random method of selecting the advertisement may be used. Alternatively, the advertisement may be selected according to the day of the week or the time of the day. Other selection methods may be used.

Where the comparison of the e-mail user's retrieved profile information against the target characteristics associated with the advertisements stored in database 16 reveals that no advertisements in database 16 comprise the target characteristics corresponding to the e-mail user's profile, the advertisement processing software means selects from among all advertisements stored in database 16.

At block 105, the advertisement processing software means appends the advertisement retrieval software means to the e-mail message. The advertisement retrieval software means comprises information about the advertisement selected for the e-mail message at block 104, but not the selected advertisement itself. The advertisement retrieval software means is operable, when the e-mail message is opened, to retrieve the selected advertisement from database 16 and append it to the e-mail message for display to the e-mail recipient. In one implementation, the advertisement retrieval software means comprises HTML code appended to the e-mail message.

In an alternative implementation of the advertisement processing software means, at blocks 104-105 of FIG. 10, the advertisement processing software means causes the advertisement itself to be selected from the plurality of advertisements contained in database 16 and appended to the e-mail message, without requiring the appended advertisement retrieval software means and the functionality thereof.

Figure 11:
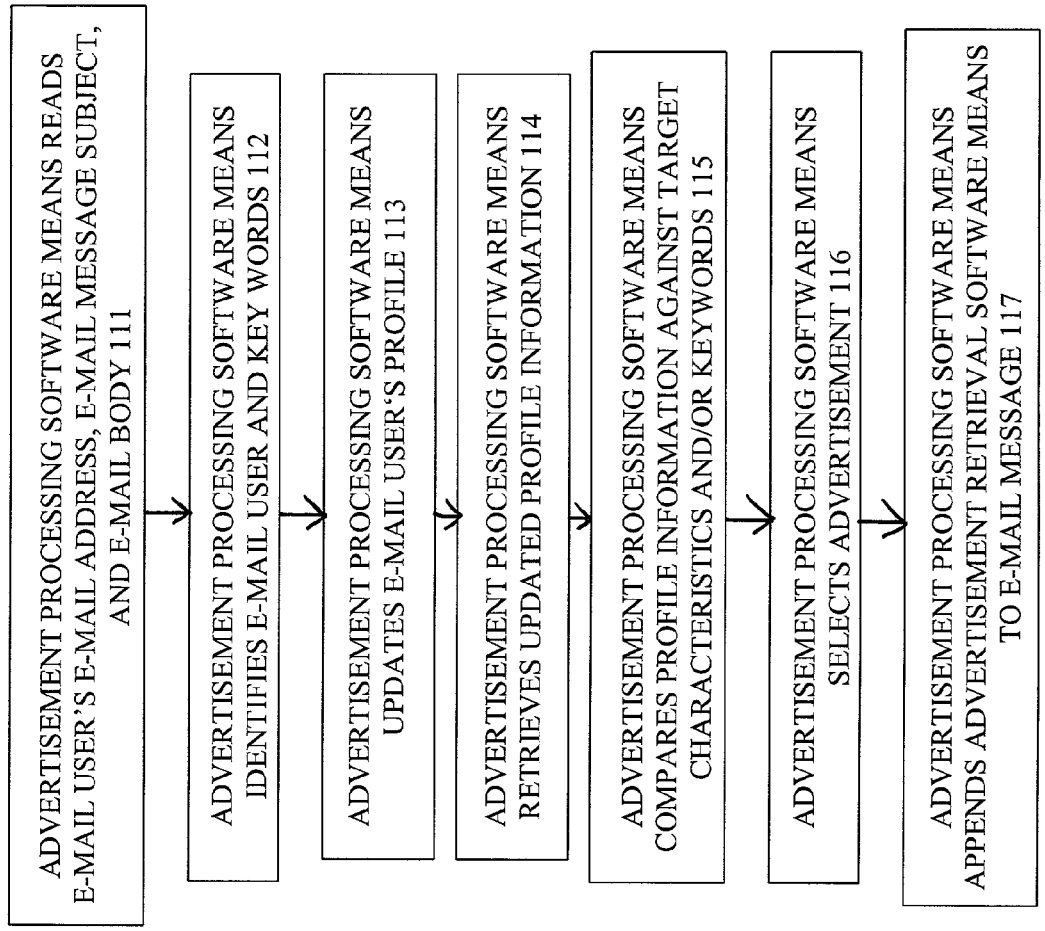
FIG. 11 shows a flow chart illustrating the operation of an implementation of the advertisement processing software means according to the present invention.

FIG. 11 shows a flow chart illustrating the operation of an implementation of the advertisement processing software means, where the system of the present invention is keyword-enabled. In FIG. 11, at block 111, the advertisement processing software means reads the e-mail address of the e-mail user sending the e-mail message, as well as the subject and the body of the e-mail message. At block 112, the advertisement processing software means identifies the e-mail user from the e-mail user's e-mail address, and also parses the subject and the body of the e-mail message to identifies keyword. At block 113, the advertisement processing software means updates the e-mails user's profile information in database 16 to record the presence of the keywords identified in block 112. At block 114, the advertisement processing software means retrieves the updated profile information about the e-mail user from database 16. At block 115 of FIG. 11, the advertisement processing software means compares the e-mail user's retrieved profile information against the target characteristics and/or keywords associated with the advertisements stored in database 16. At block 116, the advertisement processing software means selects an advertisement from database 16. Preferably, comparison of the e-mail user's retrieved profile information against the target characteristics and/or keywords associated with the advertisements stored in database 16 in block 115 reveals that one or more advertisements in database 16 comprise the target characteristics and/or keywords corresponding to the e-mail user's profile. The advertisement then may be selected in block 116 from among these one or more advertisements. Where the comparison of the e-mail user's retrieved profile information against the target characteristics and/or keywords associated with the advertisements stored in database 16 reveals that a plurality of advertisements in database 16 comprise target characteristics and/or keywords corresponding to the e-mail user's profile, the advertisement to be appended to the e-mail message may be selected from among this plurality of advertisements according to one of several possible methods. For example, a first in, first out method of selecting the advertisement may be used. Alternatively, a random method of selecting the advertisement may be used. Alternatively, the advertisement may be selected according to the day of the week or the time of the day. Other selection methods may be used.

Where the comparison of the e-mail user's retrieved profile information against the target characteristics and/or keywords associated with the advertisements stored in database 16 reveals that no advertisements in database 16 comprise the target characteristics and/or keywords corresponding to the e-mail user's profile, the advertisement processing software means selects from among all advertisements stored in database 16.

At block 117, the advertisement processing software means appends the advertisement retrieval software means to the e-mail message. The advertisement retrieval software means comprises information about the advertisement selected for the e-mail message at block 116, but not the selected advertisement itself. The advertisement retrieval software means is operable, when the e-mail message is opened, to retrieve the selected advertisement from database 16 and append it to the e-mail message for display to the e-mail recipient. In one implementation, the advertisement retrieval software means comprises HTML code appended to the e-mail message In an alternative implementation of the advertisement processing software means, at blocks 116-117 of FIG. 11, the advertisement processing software means causes the advertisement itself to be selected from the plurality of advertisements contained in database 16 and appended to the e-mail message, without requiring the appended advertisement retrieval software means and the functionality thereof.

After the e-mail message has been processed according to block 75 and block 76, at block 77 the e-mail message is delivered to computer network 13 where it is routed according to means well known in the art to the mailbox of each e-mail recipient, shown at block 78.

The e-mail resides in the mailbox of e-mail recipient 15 until, at block 79, it is accessed by each e-mail recipient operating a second client computer 15 according to an e-mail access protocol known in the art such as, for example, the Post Office Protocol 3 ("POP3"), the Internet Mail Access Protocol ("IMAP"), or a similar e-mail message access protocol.

Where the e-mail message comprises advertisement retrieval software means, the advertisement retrieval software means executes when the e-mail message is opened, as shown at block 80. Execution of the advertisement retrieval software means causes second client computer 15 to enter into bi-directional communication with host server 12 through network 13. The advertisement retrieval software means causes second client computer 15 to transmit a request for the advertisement selected in block 76 of FIG. 7A to host server 12. Host server 12 responds to this request by transmitting the requested advertisement over network 13 to second client computer 15, where it appears with the e-mail message on the video display terminal of second client computer 15.

Figure 7B:
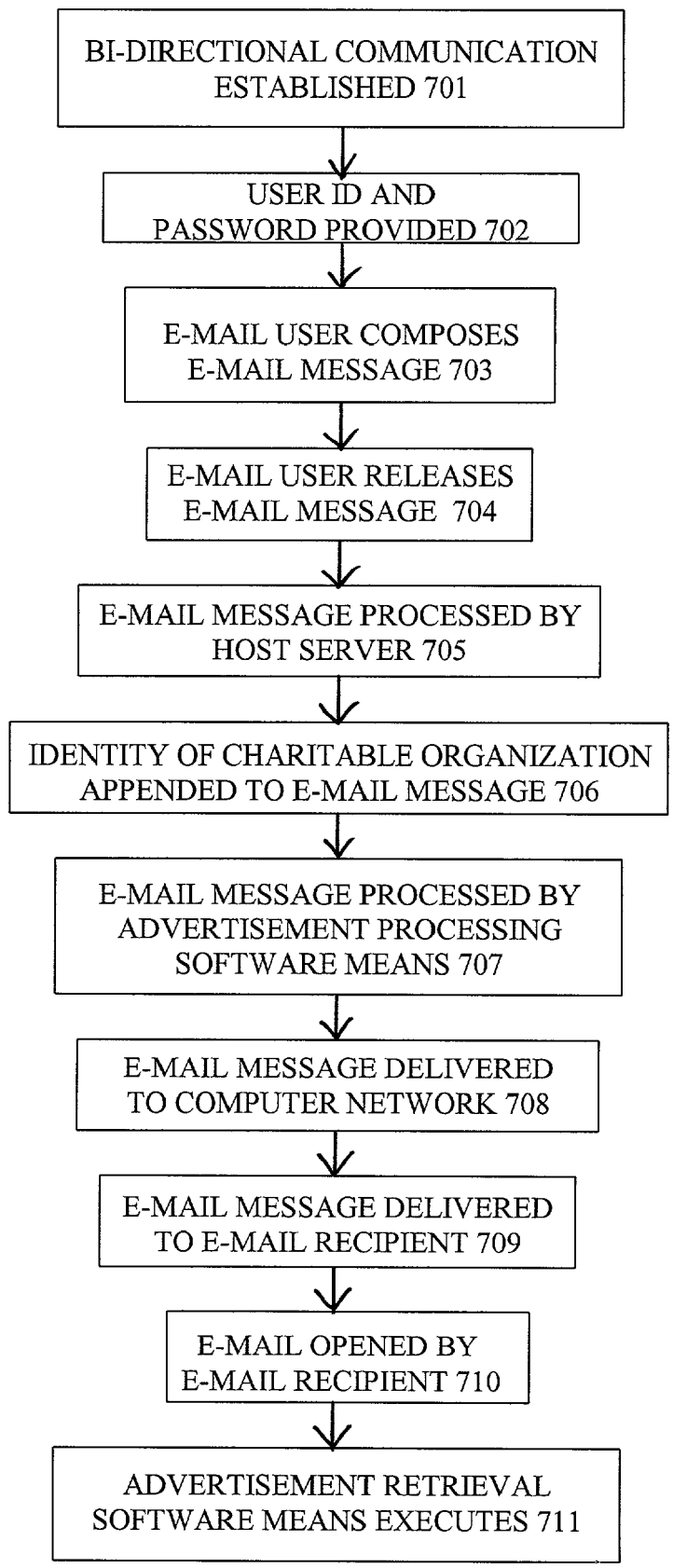
FIG. 7B shows a flow chart of the operation of one embodiment of the method for sending an e-mail message according to the present invention.

After the e-mail account of the e-mail user has been established, and the database records for the charitable organization and for the advertiser have been established, the user may send e-mail messages appended with advertising according to the second embodiment of the present invention, with a portion of the advertising revenue to go to the designated charitable organization. FIG. 7B shows a flow chart of the operation of one implementation of the method for sending e-mail messages appended with advertising according to the second embodiment of the present invention. In this second embodiment, e-mail messages are transmitted by the e-mail user according to the Web-based e-mail scheme. According to this scheme, the e-mail user does not require e-mail client software residing on first client computer 11. Instead, if the e-mail user has established an e-mail account with the system operator, then while bi-directional communication exists between host server 12 and first client computer 11, through interaction between the Web browser software means on first client computer 11 and software means resident on host server 12, the e-mail user may accomplish functions common to many e-mail systems known in the art. For example, the e-mail user may compose messages, send messages, read messages, forward messages, delete messages, and perform other well-known e-mail functions.

In FIG. 7B, at block 701 the e-mail user establishes bi-directional communication between first client computer 11 and host server 12, resulting in host server 12 transmitting over computer network 14 a webpage to be displayed on the video display terminal of first client computer 11. The webpage comprises an electronic form into which the e-mail user enters data comprising a User ID and Password. Preferably, the data comprising the Password is never displayed on the video display terminal of first client computer 11. At block 702, the e-mail user enters into the displayed webpage the User ID and Password of the e-mail user, which information subsequently is transmitted to host server 12. Upon receipt, host server 12 compares the User ID and Password submitted by the e-mail user with the User ID and Password provided by the e-mail user when he established his/her e-mail account. If the User ID and Password provided by e-mail user 11 at block 702 match the User ID and Password provided by e-mail user 11 when he/she established his/her e-mail account, the e-mail user is permitted to access his/her e-mail account. Although not shown in FIG. 7B, after the e-mail user establishes bi-directional communication between first client computer 11 and host server 12, the e-mail user may perform maintenance activities on his/her e-mail user data stored in database 16. For example, the e-mail user may change his address or telephone number, or designate a different charitable organization.

When the e-mail user composes e-mail messages, such as at block 703, the e-mail user does so according to methods well known in the art. The e-mail message comprises two component parts: a header part and a body part. The header part comprises the e-mail address of the e-mail user, the e-mail address of at least one e-mail recipient, and the subject of the message. The body part comprises the textual and/or pictorial message to be transmitted to the at least one e-mail recipient.

When the e-mail user is satisfied with the contents of the header part of the e-mail message and with the contents of the body part of the e-mail message, he/she may instruct the e-mail system to transmit the message to each e-mail recipient. The act of releasing the e-mail message to be routed to each e-mail recipient is shown at block 704.

At block 705, the e-mail message is processed by host server 12 acting as a mail server. Host server 12 processes the e-mail message according to an e-mail protocol known in the art such as, for example, the Simple Mail Transfer Protocol ("SMTP"). Optionally, host server 12 may process the e-mail message according to the X.400 protocol or another e-mail protocol known in the art in lieu of SMTP.

At block 706, the e-mail message is processed by an advertisement processing software means associated with database 16 and host server 12. In this step, the advertisement processing software means causes a first sub-message containing the identity of the charitable organization designated by the e-mail user to receive the contributions generated by his/her e-mail messages to be appended to the e-mail message. In one alternative implementation of this second embodiment of the present invention, the software means determines the identity of the charitable organization to be included in the first appended sub-message according to the unique code assigned to the charitable organization by the system operator.

At block 707, the e-mail message is processed by an advertisement processing software means associated with database 16 and host server 12. During this step, the advertisement processing software means causes an advertisement retrieval software means to be appended to the e-mail message. The advertisement retrieval software means is operable, when the e-mail message is opened by each e-mail recipient, to cause the advertisement to be appended to the e-mail message. The details of this operation are shown in FIG. 10 and FIG. 11, and were described previously herein.

After the e-mail message has been processed according to block 705, block 706, and block 707, at block 708 the e-mail message is delivered to computer network 13 where it is routed according to means well known in the art to the mailbox of each e-mail recipient, shown at block 709.

The e-mail resides in the mailbox of each e-mail recipient 15 until, at block 710, it is accessed by each e-mail recipient operating a second client computer 15 according to an e-mail access protocol known in the art such as, for example, the Post Office Protocol 3 ("POP3"), the Internet Mail Access Protocol ("IMAP"), or a similar e-mail message access protocol.

Where the e-mail message comprises advertisement retrieval software means, the advertisement retrieval software means executes when the e-mail message is opened, as shown at block 711. Execution of the advertisement retrieval software means causes second client computer 15 to enter into bi-directional communication with host server 12 through network 13. The advertisement retrieval software means causes second client computer 15 to transmit a request for the advertisement selected in block 707 of FIG. 7B to host server 12. Host server 12 responds to this request by transmitting the requested advertisement over network 13 to second client computer 15, where it appears with the e-mail message on the video display terminal of second client computer 15.

It will be recognized by those of skill in the art that the mission of a certain charitable organization may so incompatible with an advertisement promulgated by an advertiser that the charitable organization does not wish to benefit from revenue generated by such an advertisement. The second embodiment of the present invention optionally provides a charitable organization the ability to disassociate itself from a particular advertiser, so that advertisements promulgated by the advertiser does not appear appended to an e-mail message where the first appended sub-message comprises the identity of the charitable organization.

The information comprising the identity of advertisers with which the charitable organization does not wish to associate is collected by the system operator according a means known in the art for transmitting information from a first entity to a second entity. For example, the information may be transmitted during a bi-directional, interactive session between a computer operated by a representative of the charitable organization and a computer or server operated by the system operator or by a representative of the system operator. In another example, the representative of the charitable organization may correspond with a representative of the system operator, and thereby transmit the information to the system operator, in a face-to-face meeting, by wired or wireless telephonic means, or by other conversational means. Alternatively, the representative of the charitable organization may complete a paper form containing the information, and submit the paper form to the system operator by a postal means, or by facsimile.

The information comprising the identity of advertisers with which the charitable organization does not wish to associate is recorded in database 16 by a means known in the art for recording information in a database. The advertisement processing software means and/or the advertisement retrieval software means used by the present invention to select an advertisement from the plurality of advertisements in database 16, comprises software means precluding an advertisement promulgated by a disassociated advertiser from appearing in an e-mail message where the identity of the disassociating charitable organization comprises the first appended sub-message.

Figure 8:
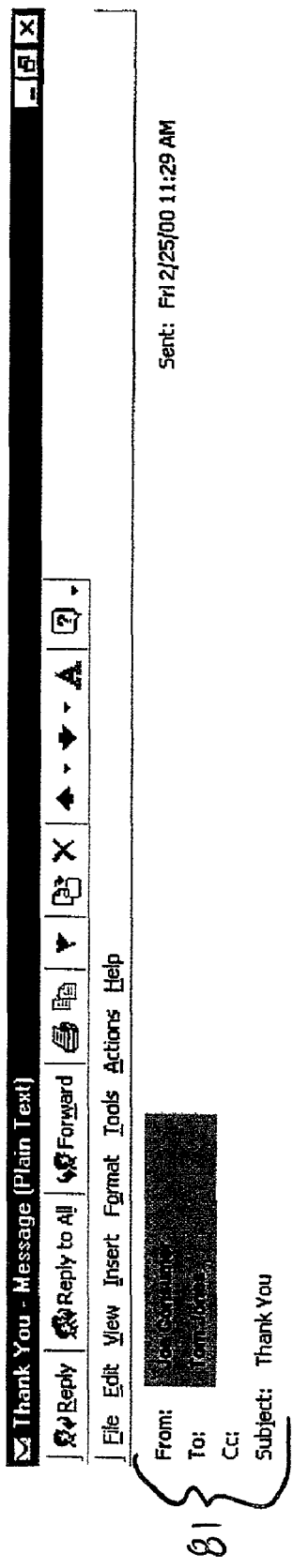
FIG. 8 shows a pictorial view of an e-mail message sent according to the present invention as the message appears when opened.

FIG. 8 shows a pictorial view of an exemplary e-mail message sent according to the second embodiment of the present invention, as the message appears when displayed on the video display terminal of second client computer 15 at block 711 of FIG. 7B. FIG. 8 shows header part 81, body part 82, a first sub-message 83 identifying the designated charitable organization, and a second sub-message 84 displaying the advertising message. An e-mail message sent according to the first embodiment of the present invention when displayed at block 80 of FIG. 7A would have a similar appearance, although in most cases would not include the first sub-message 83 identifying the designated charitable organization.

Optionally, the appended advertisement comprises a hyperlink whereby the e-mail recipient may establish bi-directional communication with a server associated with the advertiser by selecting the hyperlink using the data entry features of second client computer 15. Preferably, selection of the hyperlink by the e-mail recipient causes information about the e-mail recipient and information about the hyperlink selected, as well as other information incidental to the communication between the e-mail recipient and the advertiser, to be captured by the system operator and stored in database 16. Such information may be used by the system operator for marketing, market research, and other similar uses.

It is important that the advertising revenue generated by e-mail messages sent according to the present invention is properly recorded and accounted for. It is preferred that the transaction whereby the advertising expense accrues to the advertiser, and whereby the advertising revenue accrues to the system operator, be an objectively measurable transaction.

According to the present invention, the foregoing advertising revenue and advertising expense accrue to the respective parties when the e-mail message sent with the appended submessages is opened by each e-mail recipient.

Figure 9:
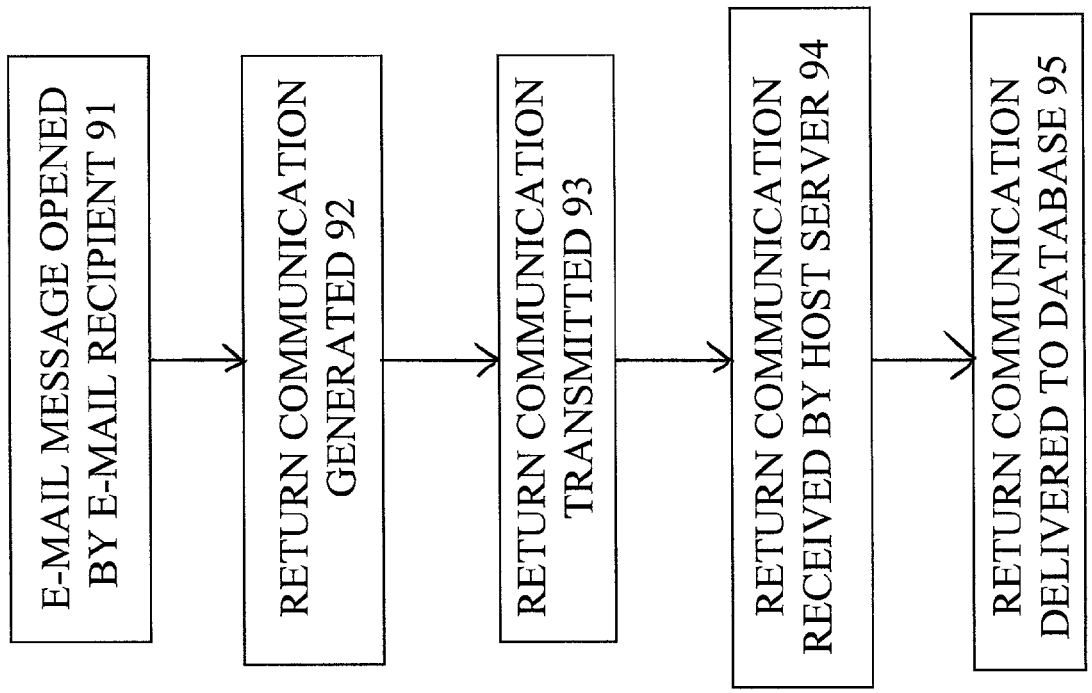
FIG. 9 shows a flow chart of the transaction resulting in advertising revenue and advertising expense accruals according to one embodiment of the present invention.

FIG. 9 shows a flow chart of the transaction resulting in the advertising revenue and advertising expense accruals according to one embodiment of the present invention. At block 91, the e-mail recipient opens the e-mail message, causing a return communication to be generated at block 92. At block 93, the return communication is transmitted from second client computer 15 across computer network 13, until it is received by host server 12 at block 94. At host server 12, the return communication is routed to database 16, shown at block 95. An advertisement accounting software means included in or associated with database 16 then causes the advertising revenue and advertising expense to be accurately accounted for within database 16 in response to the return communication. Optionally, the advertisement accounting software means communicates electronically and shares information with a bookkeeping software means such as, for example, the bookkeeping software means sold by Intuit, Inc. under the trade name QUICKBOOKS®. In circumstances where the e-mail user addresses an e-mail message to more than one e-mail recipient, each instance of the e-mail message opened by an e-mail recipient generates a return message which results in an accrual of advertising expense and advertising revenue.

The system operator utilizes information from database 16, from the advertisement accounting software means included in or associated with database 16, and/or from the bookkeeping software means to charge the advertiser according to the terms and conditions of the contract between the parties. The system operator utilizes the information from database 16, from the advertisement accounting software means included in or associated with database 16, and/or from the bookkeeping software means to account for its own revenue generated by the present invention.

According to the second embodiment of the present invention, the system operator also utilizes information from database 16, from the advertisement accounting software means included in or associated with database 16, and/or from the bookkeeping software means to remit to the charitable organization the portion of the charitable contributions owed to the charitable organization. Where a contract exists between the parties, the portion remitted to the charitable organization is in accordance with the terms and conditions of the contract. Otherwise, the portion remitted to the charitable organization depends on the discretion of the system operator.

It is within the scope of the present invention that either the first embodiment of the second embodiment of the present invention may be adapted for use where the e-mail user is operating according to an e-mail client e-mail scheme, permitting the e-mail user to compose e-mail messages without the need for first client computer 11 to be in bi-directional communication with host server 12.

In a typical e-mail client e-mail scheme, the outgoing e-mail messages transmitted from first client computer 11 passes through a mail server operated by the ISP of the e-mail user. This arrangement exists for the convenience of the e-mail user, but is not required. The outgoing e-mail messages of the e-mail user may pass through any outgoing mail server, as long as it is processed thereby according to one of the well known e-mail protocols such as SMTP or X.400.

Adaptation of the present invention for use where the e-mail user is operating according to an e-mail client e-mail scheme, requires the same preliminary activities as were required in the Web-based e-mail scheme. In addition, to adapt the present invention for use where the e-mail user is operating according to an e-mail client e-mail scheme, the e-mail user must direct his/her outgoing e-mail messages to be delivered to host server 12 acting as a mail server, instead of to the mail server operated by his ISP (except where the system operator and the ISP are the same entity). It is known in the art of e-mail client software to include in the e-mail client software a software means permitting an e-mail user to designate by its URL the mail server to process the outgoing e-mail messages transmitted from the client computer. To adapt the present invention for use where the e-mail user is operating according to an e-mail client e-mail scheme, the e-mail user uses the software means included in the e-mail client software to designate by its URL host server 12, acting as a mail server.

Referring back to FIG. 7A and FIG. 7B, the activities shown in blocks 71 and 72 of FIG. 7A and blocks 701 and 702 of FIG. 7B are not required according to an adaptation of the present invention for use with an e-mail client e-mail scheme. The activities shown in blocks 73 through 80 of FIG. 7A and blocks 703 through 711 of FIG. 7B are unchanged according to an adaptation of the present invention for use with an e-mail client e-mail scheme. Referring back to FIG. 8, the appearance of an e-mail message according to an adaptation of the present invention for use with an e-mail client e-mail scheme is unchanged. Referring back to FIG. 9, transaction resulting in the advertising revenue and advertising expense accruals also is unchanged according to an adaptation of the present invention for use with an e-mail client e-mail scheme.

The present invention provides a system and a method whereby revenue may be generated from advertising appended to e-mail messages. The present invention further comprises a system and a method whereby revenue from advertising appended to e-mail messages can be used to support a charitable organization designated by the e-mail user. The system and method of the present invention operate with either predominant e-mail scheme.

While this invention has been described as having a preferred design, the present invention can be further modified within the scope and spirit of this disclosure. This application is therefore intended to cover any variation, uses, or adaptation of the invention using its general principle. Further, this application is intended to cover such departures from the present disclosure as come within known or customary practice in the art to which this invention pertains and which fall within the limits of the appended claims.

We claim:

1. A method for generating revenue using electronic mail, comprising the steps of:
   receiving an e-mail message addressed to at least one e-mail recipient from a first client computer through at least one computer network, wherein the e-mail message comprises an e-mail address of an e-mail user sending the e-mail message, an e-mail address of the at least one e-mail recipient, a subject, and a body;
   appending advertisement retrieval software means to the e-mail message transmitted from the first client computer, wherein the advertisement retrieval software means comprises information about at least one of a plurality of advertisements retrievably stored in a database that are not from the e-mail user sending the e-mail message; and
   transmitting the e-mail message to a second client computer through the at least one computer network based upon the e-mail address of the at least one e-mail recipient for displaying the e-mail message on the second client computer, wherein when the email message is first displayed on the second client computer the advertisement software retrieval means is operable at the second client computer to retrieve at least one of the advertisements retrievably stored in the database for display within the e-mail message on the second client computer.

2. The method of claim 1, further comprising the step of:
storing profile information about the e-mail user in the database, and wherein the information about the at least one of a plurality of advertisements stored in the database comprises target characteristics associated with each of the plurality of advertisements, and wherein the step of appending advertisement retrieval software means to the e-mail message comprises the steps of:
reading the e-mail address of the e-mail user sending the e-mail message from the e-mail message;
identifying the e-mail user sending the e-mail message according to the e-mail user's e-mail address;
retrieving profile information about the e-mail user sending the e-mail message from the database;
comparing the e-mail user's retrieved profile information against the target characteristics associated with the advertisements;
selecting at least one advertisement comprising target characteristics which correlate positively to the e-mail user's profile information; and
appending advertisement retrieval software means to the e-mail message, the advertisement retrieval software means comprising information about the at least one selected advertisement.

3. The method of claim 1, further comprising the step of:
storing profile information about the e-mail user in the database, and wherein the information about the at least one of a plurality of advertisements stored in the database comprises at least one keyword associated with each of the plurality of advertisements, and wherein the step of appending advertisement retrieval software means to the e-mail message comprises the steps of:
reading the e-mail address of the e-mail user sending the e-mail message from the e-mail message;
identifying the e-mail user sending the e-mail message according to the e-mail user's e-mail address;
parsing the subject and body of the e-mail message to identify keywords which may be present therein;
updating the e-mail user's profile information in the database;
retrieving updated profile information about the e-mail user sending the e-mail message from the database;
comparing the e-mail user's retrieved profile information against the at least one keyword associated with the advertisements;
selecting an advertisement comprising at least one of the associated keywords which correlates positively to the e-mail user's profile information; and
appending advertisement retrieval software means to the e-mail message, the advertisement retrieval software means comprising information about the at least one selected advertisement.

4. The method of claim 1, further comprising the steps of:
receiving a return communication from the second client computer when the e-mail message is displayed on the second client computer; and
accounting for advertising revenue and advertising expense in response to the receipt of the return communication.

5. A method for sending e-mail messages appended with advertising, comprising the steps of:
storing an identifier for an entity selected by an e-mail user sending an e-mail message;
receiving the e-mail message addressed to at least one e-mail recipient from a first client computer through at least one computer network, wherein the e-mail message comprises an e-mail address of the e-mail user sending the e-mail message, an e-mail address of the at least one e-mail recipient, a subject, and a body;
appending advertisement retrieval software means to the e-mail message transmitted from the first client computer, wherein the advertisement retrieval software means comprises information about at least one of a plurality of advertisements retrievably stored in a database, the at least one of the plurality of advertisements are not from the e-mail user sending the e-mail message;
transmitting the e-mail message to a second client computer through the at least one computer network based upon the e-mail address the of at least one e-mail recipient for displaying the e-mail message on the second client computer;
transmitting at least one of the plurality of advertisements stored in the database for display within the e-mail message on the second client computer; and
accounting for a contribution to the entity identified by the stored identifier.

6. The method of claim 5, further comprising the step of:
storing profile information about the e-mail user sending the e-mail message in the database, and wherein the information about the at least one advertisement stored in the database comprises target characteristics associated with each advertisement, and wherein the information about the e-mail user sending the e-mail message stored in the database comprises profile information about the e-mail user sending the e-mail message,
and wherein the step of appending advertisement retrieval software means to the e-mail message comprises the steps of:
reading the e-mail address of the e-mail user sending the e-mail message from the e-mail message;
identifying the e-mail user sending the e-mail message according to the e-mail user's e-mail address;
retrieving profile information about the e-mail user sending the e-mail message from the database;
comparing the e-mail user's retrieved profile information against the target characteristics associated with the advertisements;
selecting at least one advertisement comprising target characteristics which correlate positively to the e-mail user's profile information; and wherein the step of appending comprises appending information about the at least one selected advertisement to the e-mail message.

7. The method of claim 5, further comprising the step of:
storing profile information about the e-mail user in the database, and wherein the information about the at least one advertisement stored in the database comprises at least one keyword associated with each advertisement, and wherein the information about the e-mail user stored in the database comprises profile information about the e-mail user, and wherein the step of appending advertisement retrieval software means to the e-mail message comprises the steps of:
reading the e-mail user's e-mail address from the e-mail message;
identifying the e-mail user according to the e-mail user's e-mail address;

parsing the subject and body of the e-mail message to identify keywords which may be present therein;

updating the e-mail user's profile information in the database;

retrieving updated profile information about the e-mail user from the database;

comparing the e-mail user's retrieved profile information against the at least one keyword associated with the advertisements;

selecting an advertisement comprising at least one of the associated keywords which correlates positively to the e-mail user's profile information; and appending advertisement retrieval software means to the e-mail message, the advertisement retrieval software means comprising information about the at least one selected advertisement.

8. A method for advertising using electronic e-mail comprising:

receiving an e-mail composed by an e-mail user from a first client computer;

appending a sub-message associated with an advertisement to the e-mail while the e-mail is enroute to a recipient based upon preferences of the e-mail user that composed the e-mail;

delivering the appended e-mail to a second client computer operated by the recipient for displaying at the second client computer the advertisement associated with the sub-message;

receiving a return communication from the second client computer when the advertisement is displayed by the second client computer; and accounting with the host server for advertising revenue in response to the receipt of the return communication, wherein the step of appending comprises appending an advertisement retrieval software means to the e-mail, and wherein the step of displaying comprises retrieving an advertisement from a host computer with the advertisement retrieval software means, and displaying the retrieved advertisement.

9. The method of claim 8, wherein the step of appending comprises:

obtaining the sub-message associated with an advertisement from a data base with a third computer; and appending the sub-message associated with an advertisement to the e-mail enroute to the recipient with the third computer.

10. The method of claim 8, further comprising:

determining profile information regarding the e-mail recipient;

comparing the profile information with target characteristics associated with the advertisement; and selecting the sub-message to be appended to the e-mail enroute to the recipient based upon the comparison.

11. The method of claim 8, further comprising:

determining profile information regarding an e-mail account used to compose the e-mail;

comparing the profile information with target characteristics associated with the advertisement; and selecting a sub-message associated with an advertisement based upon the comparison, and wherein:

the step of appending a sub-message associated with an advertisement to the email enroute to the recipient comprises appending the selected sub-message.

12. The method of claim 8, further comprising:

accounting for a contribution to an entity designated by the e-mail user that composed the e-mail in response to the receipt of the return communication.

* * * * *